United States Patent
Golla et al.

(10) Patent No.: US 9,262,171 B2
(45) Date of Patent: Feb. 16, 2016

(54) DEPENDENCY MATRIX FOR THE DETERMINATION OF LOAD DEPENDENCIES

(75) Inventors: Robert T. Golla, Round Rock, TX (US);
Matthew B. Smittle, Allen, TX (US);
Xiang Shan Li, Austin, TX (US)

(73) Assignee: Oracle America, Inc., Redwood Shores, CA (US)

(*) Notice: Subject to any disclaimer, the term of this patent is extended or adjusted under 35 U.S.C. 154(b) by 1411 days.

(21) Appl. No.: 12/495,025

(22) Filed: Jun. 30, 2009

(65) Prior Publication Data
US 2010/0332806 A1   Dec. 30, 2010

(51) Int. Cl.
G06F 15/00 (2006.01)
G06F 9/30 (2006.01)
G06F 9/40 (2006.01)
G06F 9/38 (2006.01)

(52) U.S. Cl.
CPC ............ *G06F 9/3842* (2013.01); *G06F 9/3838* (2013.01); *G06F 9/3851* (2013.01); *G06F 9/3855* (2013.01); *G06F 9/3857* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 5,553,256 A | 9/1996 | Fetterman et al. | |
| 5,581,684 A | 12/1996 | Dudzik et al. | |
| 5,710,902 A * | 1/1998 | Sheaffer et al. | 712/216 |
| 5,761,476 A | 6/1998 | Martell | |
| 5,790,857 A | 8/1998 | Clifford et al. | |
| 5,913,049 A | 6/1999 | Shiell et al. | |
| 5,918,005 A | 6/1999 | Moreno et al. | |
| 5,923,328 A | 7/1999 | Griesmer | |
| 5,933,139 A | 8/1999 | Feigner et al. | |
| 5,961,634 A | 10/1999 | Tran | |
| 6,005,824 A | 12/1999 | Crafts | |
| 6,044,031 A | 3/2000 | Iadanza et al. | |
| 6,268,314 B1 | 7/2001 | Hughes et al. | |
| 6,360,314 B1 | 3/2002 | Webb, Jr. et al. | |
| 6,622,237 B1 | 9/2003 | Keller et al. | |
| 6,629,233 B1 | 9/2003 | Kahle | |
| 6,988,183 B1 * | 1/2006 | Wong | 712/208 |
| 2009/0328057 A1 * | 12/2009 | Lahav et al. | 718/106 |
| 2010/0257341 A1 * | 10/2010 | Brown | G06F 9/3838 712/216 |

OTHER PUBLICATIONS

Goshima (A High-Speed Dynamic Instruction Scheduling Scheme for Superscalar Processors, Published 2001, pp. 225-236).*

* cited by examiner

*Primary Examiner* — George Giroux
(74) *Attorney, Agent, or Firm* — Rory D. Rankin; Meyertons, Hood, Kivlin, Kowert & Goetzel, P.C.

(57) ABSTRACT

Systems and methods for identification of dependent instructions on speculative load operations in a processor. A processor allocates entries of a unified pick queue for decoded and renamed instructions. Each entry of a corresponding dependency matrix is configured to store a dependency bit for each other instruction in the pick queue. The processor speculates that loads will hit in the data cache, hit in the TLB and not have a read after write (RAW) hazard. For each unresolved load, the pick queue tracks dependent instructions via dependency vectors based upon the dependency matrix. If a load speculation is found to be incorrect, dependent instructions in the pick queue are reset to allow for subsequent picking, and dependent instructions in flight are canceled. On completion of a load miss, dependent operations are re-issued. On resolution of a TLB miss or RAW hazard, the original load is replayed and dependent operations are issued again from the pick queue.

18 Claims, 13 Drawing Sheets

Table 910

Latencies 900

| Instruction | Producer Instruction is Picked in this Clock Cycle | Number of Clock Cycles for Issue | Latency in Clock Cycles from Producer | Producer result is available in this Clock Cycle | Producer Trigger is asserted in this Clock Cycle | Needed Additional Delay in Clock Cycles |
|---|---|---|---|---|---|---|
| Consumer0 | 10 | 3 | 5 | 10 + 3 + 5 + 1 = 19 | 19 - 3 - 1 = 15 | 0 |
| Consumer1 | 10 | 3 | 5 | 10 + 3 + 5 + 1 = 19 | 19 - 3 - 1 = 15 | 0 |
| Consumer2 | 10 | 3 | 5 | 10 + 3 + 5 + 1 = 19 | 19 - 3 - 1 = 15 | 0 |
| Consumer3 | 10 | 3 | 7 | 10 + 3 + 7 + 1 = 21 | 15 | 2 |

FIG. 8

DEPENDENCY MATRIX FOR THE DETERMINATION OF LOAD DEPENDENCIES

BACKGROUND OF THE INVENTION

1. Field of the Invention

This invention relates to computing systems, and more particularly, to efficient identification of dependent instructions on speculative load operations in a processor.

2. Description of the Relevant Art

Modern microprocessors typically have increasing pipeline depth in order to support higher clock frequencies and increased microarchitectural complexity. A modern pick queue, or alternative instruction scheduler, selects multiple dispatched instructions out of program order to enable more instruction level parallelism, which yields higher performance. Also, out-of-order (o-o-o) issue and execution of instructions helps hide instruction latencies. However, despite improved device speed, higher clock frequencies of next-generation processors allow fewer levels of logic to fit within a single clock cycle compared to previous generations. Also, the deep pipelining trend encourages designers to reduce the circuit complexity of individual stages in order to both maintain the high clock frequencies and manage power dissipation.

In addition, the deep pipelining trend has made it advantageous to predict the events that may happen in the pipe stages ahead. One example of this technique is latency speculation between an instruction and a younger (in program order) dependent instruction. These younger dependent instructions may be picked for out-of-order (o-o-o) issue and execution prior to a broadcast of the results of a corresponding older (in program order) instruction.

When the load instruction misses in the cache, a misprediction of the speculative load occurs. As the pipeline depth increases, both the load instruction latency increases and more corresponding younger dependent instructions will be scheduled before a load miss is identified. After a load miss, the younger dependent instructions that were picked and issued speculatively may need to be restarted or delayed in order that they execute again with correct inputs. This recovery process is called replay.

One approach for recovery includes deallocating the younger dependent instructions from the pick queue, or alternative scheduler, at the time of their early pick before a load miss. Then after a load miss, all younger instructions are re-fetched. While this approach eliminates storing post-issue instructions in the pick queue, performance may suffer due to the overhead associated with re-fetching the instructions.

In a similar manner, a second approach maintains storage of all younger (in program order) instructions relative to the load instruction in the pick queue until the older load instruction hit status is known. The speculative window for the load instruction begins with the cycle wherein the load instruction is picked and ends with the cycle wherein the load miss to the cache is detected. In the case of a load miss in the cache, there are two replay mechanisms that may be chosen for recovery. In flush replay, all instructions in the speculative window are flushed and re-executed whether or not they are dependent on the load instruction. As the speculative window increases, the number of instructions to re-execute increases. Therefore, flush replay is less desirable for deep pipelines and may reduce the benefit out-of-order speculation.

An alternative replay mechanism includes selective replay, wherein the processor only re-executes the instructions that depend on the older load instruction that missed in the cache. For selective replay, a mechanism is needed to construct the data dependence chain. One method includes broadcasting the corresponding reorder buffer (ROB) entry number of the older load instruction. However, this is a serial process that includes comparators, such as power consuming content-addressable memory (CAM) circuitry.

Another method for identifying younger dependent instructions includes the Half-Price architecture, see I. Kim, et al, Half-Price Architecture, In Proceedings of the 30th International Symposium on Computer Architecture (ISCA-30), June 2003. However, this method includes a shifting matrix for each source operand, wherein this matrix is a separate structure from a dependency matrix that may accompany a pick queue.

Each source operand shifting matrix has a width of the instruction issue width of the processor and a depth of the number of pipeline stages within the speculative window of the load instruction. Also, the authors point out that the combination of tag elimination with broadcast-based selective instruction replay is not practical to implement. Further, once a load instruction misprediction occurs, a kill vector is broadcast to each instruction where this vector is compared to the last row of each source operand matrix. The identification of the younger dependent instructions is not known until the completion of the broadcast and comparison operations.

A third method for identifying younger dependent instructions includes the use of timed queues, see A. Merchant, et al, Computer processor having a checker, U.S. Pat. No. 6,212, 626, April 2001. However, this method inserts a delay into an instruction's execution latency through the use of a queue, rather than re-execute dependent instructions. If there is a load instruction misprediction, the corresponding output will not be set as ready, which will trigger a replay for the younger dependent instructions and its dependent instructions. Therefore, these dependent instructions may not begin execution as early as possible due to possible repeated replay.

In view of the above, efficient methods and mechanisms for efficient identification of dependent instructions on speculative load operations in a processor are desired.

SUMMARY OF THE INVENTION

Systems and methods for efficient identification of dependent instructions on speculative load operations in a processor are contemplated. In one embodiment, a processor comprises a unified pick queue for dynamically allocating entries for decoded and renamed instructions. Each entry is configured to store a dependency bit for each other instruction in the array. An asserted dependency bit indicates the given instruction depends on a result of a corresponding other instruction. For a given load instruction picked for execution, during each pipe stage prior to a corresponding speculation status is resolved, the circuitry within the pick queue is configured to determine whether each entry comprises an instruction dependent upon the load instruction. This determination may be based upon the separate dependency bits and the dependency vector. Also, the circuitry, or control logic, may update the dependency vector with the results of the determination. These and other embodiments will become apparent upon reference to the following description and accompanying drawings.

BRIEF DESCRIPTION OF THE DRAWINGS

FIG. 8 is a generalized table illustrating one embodiment of producer-consumer pair latencies.

Figure 1:
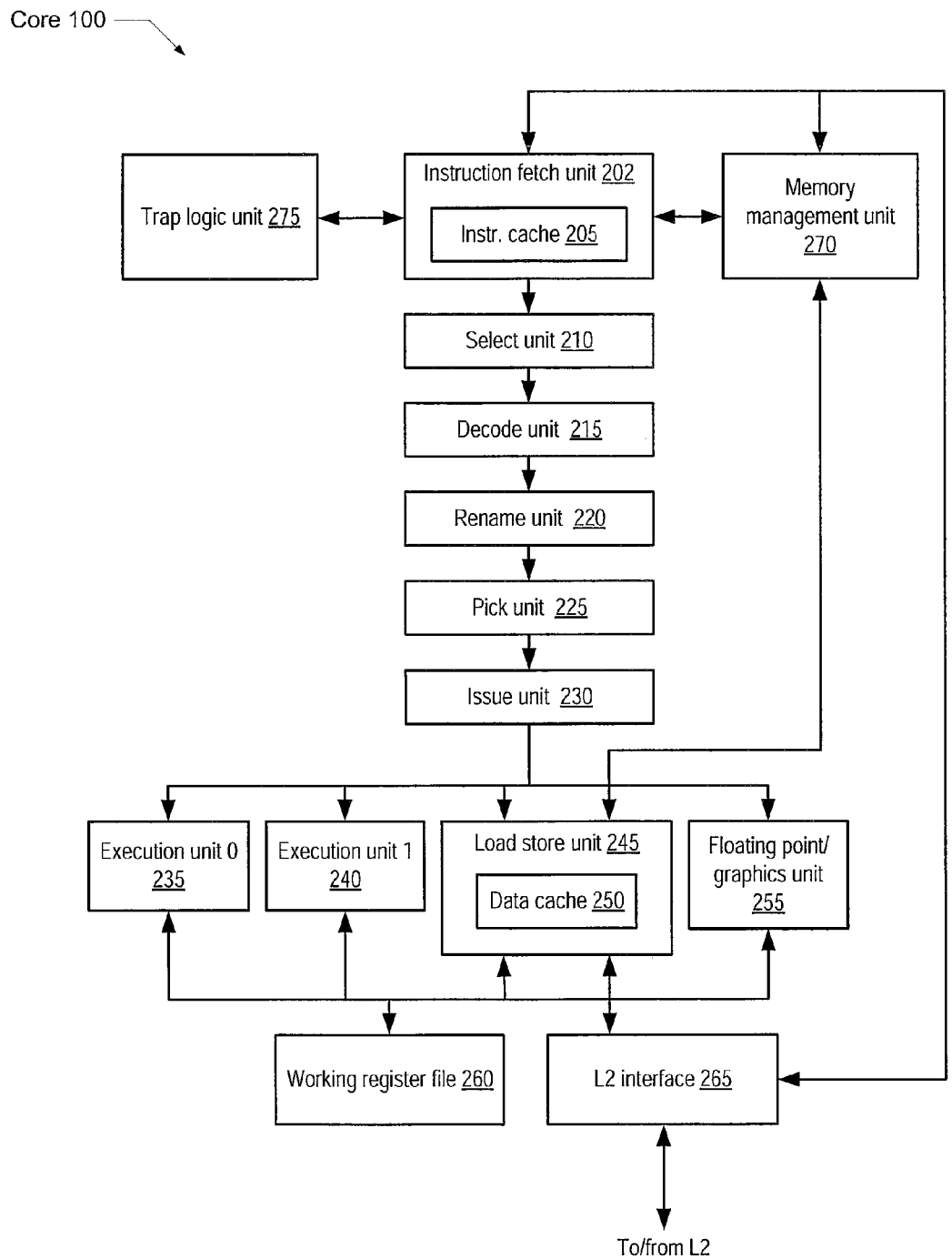
FIG. 1 is a generalized block diagram illustrating one embodiment of a processor core configured to perform dynamic multithreading.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a processor core 100 configured to perform dynamic multithreading is shown. Processor core, or core, 100 processor core 102 may utilize conventional processor design techniques such as complex branch prediction schemes, out-of-order execution, and register renaming techniques. Core 100 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 100 may access a cache memory subsystem for data and instructions. Core 100 may contain its own level 1 (L1) and level 2 (L2) caches in order to reduce memory latency. Alternatively, these cache memories may be coupled to processor cores 100 in a backside cache configuration or an inline configuration, as desired.

In one embodiment, processor core 100 may support execution of multiple threads. Multiple instantiations of a same processor core 100 that is able to concurrently execute multiple threads may provide high throughput execution of server applications while maintaining power and area savings. A given thread may include a set of instructions that may execute independently of instructions from another thread. For example, an individual software process may consist of one or more threads that may be scheduled for execution by an operating system. Such a core 100 may also be referred to as a multithreaded (MT) core. In one embodiment, core 100 may be configured to concurrently execute instructions from a variable number of threads, such as up to eight concurrently executing threads.

In one embodiment, core 100 may be configured for multithreaded, out-of-order execution. More specifically, in one embodiment, core 100 may be configured to perform dynamic multithreading. Generally speaking, under dynamic multithreading, the execution resources of core 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound—completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, core 100 may be configured to implement fine-grained multithreading, in which core 100 may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, core 100 may be configured to efficiently process workloads that depend more on concurrent thread processing than individual thread performance.

In one embodiment, core 100 may also be configured to implement out-of-order processing, speculative execution, register renaming and/or other features that improve the performance of processor-dependent workloads. Moreover, core 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

In the illustrated embodiment, core 100 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 102 may be implemented. Alternative configurations and variations are possible and contemplated.

Instruction fetch unit (IFU) 202 may be configured to provide instructions to the rest of core 100 for execution. In one embodiment, IFU 202 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 202 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 100, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Regarding the pick queue in the pick unit 225, in order to maintain high performance, the selection of multiple decoded and renamed instructions to send to the issue unit 230 occurs in a single pipeline stage. As described above, a pick queue within the pick unit 225 may store a number of decoded and renamed instructions as well as information about the relative age and status of the stored instructions. During a single clock cycle Pick pipeline stage, instructions may be picked from a number of instructions stored in the pick queue within the pick unit 225. Picked instructions are sent to the issue unit 230.

Logic within the pick unit 225 may split the instruction pick operation into two tasks, wherein a first task is responsible for dataflow ordering, such as instruction dependencies. A subsequent second task is responsible for resource allocation and age tracking. A dependency cycle formed between logic to perform the first task which identifies ready instructions, and logic to perform the second task which selects a set of ready instructions for execution, forms a tight loop which is well known as critical to performance as described by E. Borch, et al. Loose loops sink chips, in Proceedings of HPCA-8, February 2002.

Typically, during the first task, which is responsible for dataflow ordering, an instruction is considered ready if it is not dependent on any other instructions in the pick queue. In order to determine an instruction stored in the pick queue is now able to obtain source operands from completed older (in program order) instructions, a broadcast of the results may be used to notify younger (in program order) dependent instructions. Generally, a broadcast observes results being generated and notifies waiting dependent instructions that are now ready for execution. Further details of the pick operation, including both first and second tasks, are provided shortly.

Figure 2A:
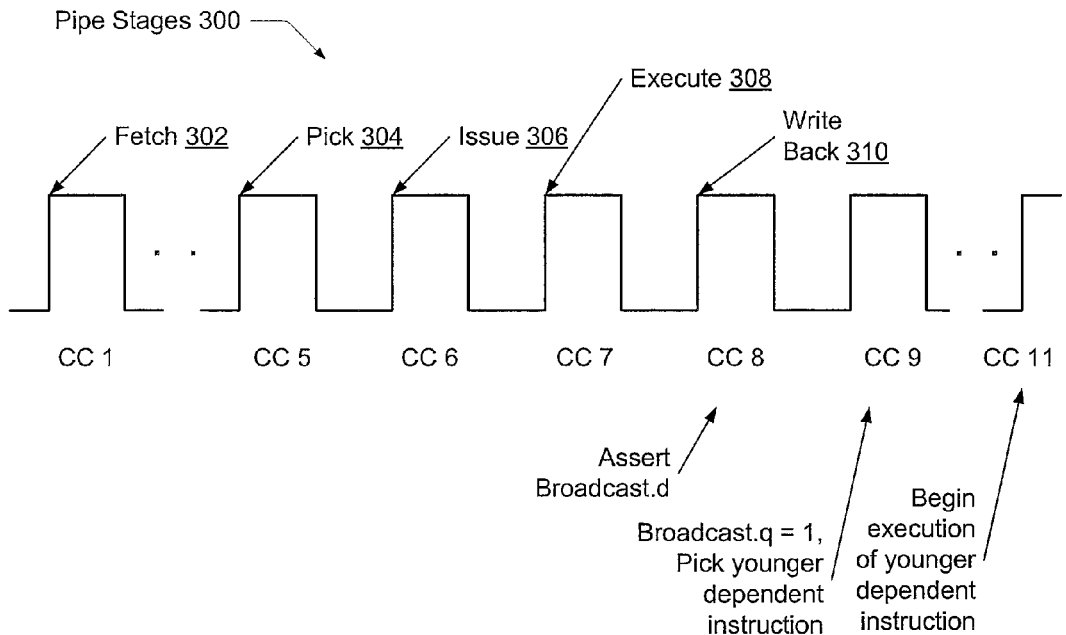
FIG. 2A is a generalized block diagram illustrating one embodiment of pipeline stages of a processor core with operand bypass signals.

Referring now to FIG. 2A, one embodiment of pipeline stages 300 of a processor core with signals indicating generation of results is shown. Here, in the embodiment shown, each pipeline stage, such as Pick 304 is shown as a single clock cycle. In this example, pipe stage Pick 304 occurs in clock cycle (CC) 5. Generally speaking, pipeline stages Fetch 302, Issue 306, Execute 308, and Write Back 310 may each be implemented with multiple clock cycles. One or more pipeline stages not shown or described may be present in addition to pipeline stages 302-310. For example, decoding, renaming, and other pipeline stages which may be present between Fetch 302 and Pick 304 are not shown for ease of illustration.

Also, there may be multiple execution pipelines, such as one for integer operations, one for floating-point operations, a third for memory operations, another for graphics processing and/or cryptographic operations, and so forth. The embodiment of pipe stages 300 shown in FIG. 2A is for illustrating the indication of generated results to younger (in program order) dependent instructions. The embodiment shown is not meant to illustrate an entire processor pipeline.

In one embodiment, when results are generated by older (in the pipeline) instructions, such as the completion of pipe stage Execute 308, a broadcast of this completion may occur. In one embodiment, the result tags may be broadcast. For example, during the Write Back 310 pipe stage, the results of an integer add instruction may be presented on a results bus. Control logic may detect a functional unit has completed its task (such as in pipe stage Write Back 310). Accordingly, certain control signals may be asserted, such as signal broadcasted, to indicate to other processor resources that this particular instruction has results available for use. For example, the control signal broadcasted may be routed to an input of a flip-flop, wherein the output of the flip-flop is an asserted broadcast.q in the subsequent pipe stage.

This broadcast signal (broadcaste.d) and storage in a flip-flop is provided as an example. In other embodiments, other control signals may be used in addition to or in place of this broadcast signal. Other control signals may include a corresponding valid signal and results tags routed to comparators within the pick queue, a corresponding valid signal and decoded pick queue entry number input to a word line driver, or otherwise. In the example shown, the signaling of available results occurs in pipe stage Write Back 310 in clock cycle 8. This assertion occurs following a last execution clock cycle of an execution pipeline. In this example, the execute pipeline (Execute 308) is a single pipe stage shown in clock cycle 7.

In the clock cycle following the pipe stage Write Back 310, clock cycle 9, younger (in program order) instructions may verify their source operands are ready, since a results broadcast has been conveyed. The logic within the pick unit 225 may pick these younger instructions that were previously waiting for the results. In one embodiment, a single cycle pipe stage, Issue 306, follows for these younger instructions and then they may begin execution in clock cycle 11.

It is noted that the timing may differ in other embodiments. For example, both the broadcast of results and the pick of instructions may occur in the pipe stage Write Back 310 in clock cycle 8. Regardless, the broadcast may be gated by the actual completion of an older (in the pipeline) instruction's operation. Additionally, the earliest start of execution of a younger (in program order) instruction may be dependent on the number of pipe stages between the pipe stage Pick 304 and the pipe stage Execute 308. In this example, there is only a single cycle Issue 306 pipe stage. However, processors may have deep pipelines, and latencies may increase significantly.

In order to improve throughput and to begin the execution of younger (in program order) dependent instructions at an earlier time, a prediction may be made regarding the completion of a corresponding older (in program) order instruction. Alternatively, a reduction may be made in the number of pipe stages between Pick 304 and Execute 308. However, it is noted that modern microarchitectures may have increasing complexity used to achieve higher performance and a reduction in pipeline depth may reduce performance. On the other hand, a prediction may increase performance when the prediction is correct. For example, when an instruction is picked in pipe stage Pick 304, the number of clock cycles until a result is produced by this particular instruction at Write Back 310 may be determinate. In the example of FIG. 2A, an integer arithmetic instruction picked in pipe stage Pick 304 in clock cycle 5 may be safely predicted to produce a result in pipe stage Write Back 310 in clock cycle 8. Rather than wait to generate a broadcast of some type in pipe stage Write Back 310 in clock cycle 8, a prediction signal may be generated earlier that allows younger dependent instructions to be picked earlier. In this manner, an efficient pipe stage overlap may exist between the producing of the results by an older instruction and the use of the results by a younger dependent instruction.

Figure 2B:
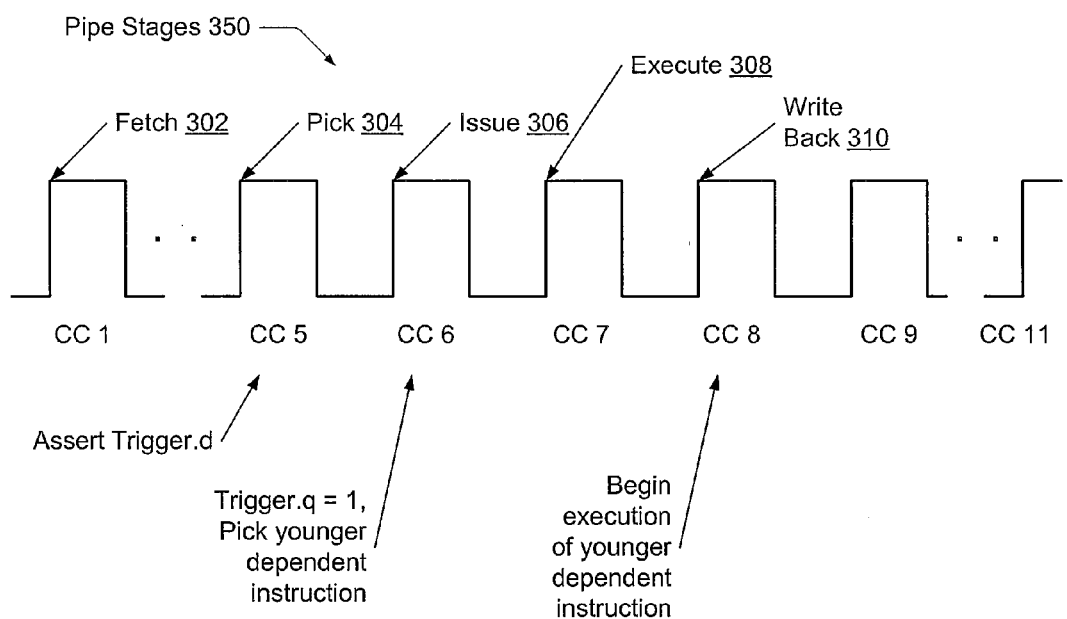
FIG. 2B is a generalized block diagram illustrating another embodiment of pipeline stages of a processor core with operand bypass signals.

Turning now to FIG. 2B, one embodiment of pipeline stages 350 of a processor core with signals indicating a predicted generation of results is shown. Pipe stages with the same functionality as pipe stages in FIG. 2A are numbered identically. In one embodiment, when an instruction is picked, such as in pipe stage Pick 304 in clock cycle 5, a prediction is made regarding the clock cycle the corresponding results will be generated. In one example, the instruction may be an integer arithmetic operation that computes a result in one execution clock cycle. In order to overlap the generation of the result in pipe stage Write Back 310 in clock cycle 8 with the beginning of pipe stage Execute 308 in clock cycle 7 of a younger dependent instruction, a prediction signal is asserted in clock cycle 6. Therefore, the younger dependent instruction may be picked in clock cycle 6 and issued in clock cycle 7. Then this younger dependent instruction may begin execution in clock cycle 8 when needed results are generated. In this example, the younger dependent instruction is able to begin execution in clock cycle 8 versus clock cycle 11 of the example in FIG. 2A.

This prediction signal, labeled "Trigger" in FIG. 2B, may be asserted in pipe stage Pick 304 (CC 5) and input to a flip-flop. Alternatively, a value corresponding to this Trigger signal (e.g., a bit) may be stored in a matrix or a queue. In pipe stage Pick 304 corresponding to clock cycle 5, it may be determined the Trigger bit corresponding to the picked older integer arithmetic instruction should be set. However, since the determination of which instructions to pick does not occur until late in the clock cycle (again, this may be the critical path of the processor), the determination to set the corresponding Trigger bit may occur late in clock cycle 5.

An entry, or an instruction, in the pick queue may be considered ready if it is not dependent on any other instructions in the pick queue. In addition, as shown in FIG. 2B in clock cycle 6, the corresponding asserted Trigger bit (Trigger.q) may be used to determine a younger dependent instruction is both ready and picked. Therefore, an instruction in the pick queue may be considered ready if (1) it is not dependent on any other instructions in the pick queue, or (2) instructions it is dependent on have been picked and triggered. In order to be picked, an instruction may be the oldest ready instruction for a corresponding hardware resource. Further explanation is provided below.

One task of an instruction pick operation corresponding to dataflow ordering may be to provide a prediction, such as the above discussed Trigger bit. This Trigger bit may be used to drive just-in-time execution of a subsequent younger dependent instruction. Each instruction that produces a result may be referred to as a producer. Each younger dependent instruction with respect to the producer may be referred to as a consumer. Control logic corresponding to the producer may determine the latency between the clock cycle the producer is picked and the clock cycle the Trigger bit is asserted. This determination may be performed at any of a variety of times. For example, in one embodiment, the determination may be made in any clock cycle between the clock cycle the producer is decoded and the clock cycle the producer is picked.

For example, referring to FIG. 2B, a producer may be an integer arithmetic instruction with single-cycle instruction execution. A determination may be made between a decode pipe stage not shown (subsequent pipe stage Fetch 302), and pipe stage Pick 304. This determination may find a latency of 0 cycles for this instruction in this particular pipeline. Therefore, the Trigger bit may be set in the same cycle as the pipe stage Pick 304. In other examples, an instruction may have two or more execution cycles. Therefore, the determined latency may be greater. For example, again referring to FIG. 2B, if it is determined a particular instruction has a known 3 cycle instruction execution, rather than a single-cycle instruction execution, then the Trigger bit may be set in clock cycle 7, rather than in clock cycle 5. Clock cycles 7, 8, and 9 may now correspond to the 3 cycles for the instruction execution.

Figure 3:
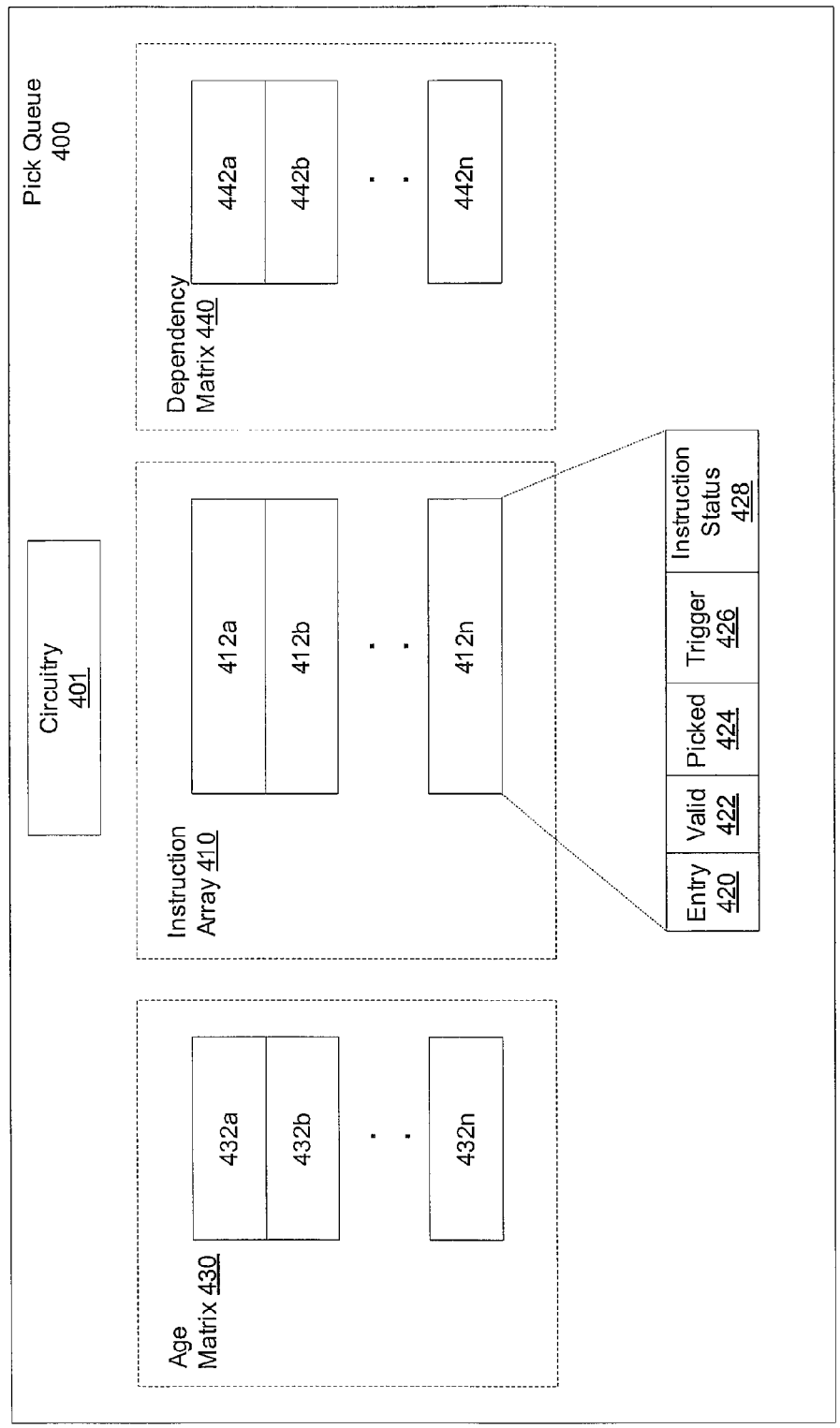
FIG. 3 is a generalized block diagram illustrating one embodiment of the entries of a pick queue.

Turning now to FIG. 3, one embodiment of a pick queue 400 configured to hold instructions that may be picked for execution is shown. In one embodiment, pick queue (PQ) 400 holds decoded (and possibly renamed) instructions in processor core 100. The buffered instructions may include micro-operations, or micro-ops, if core 100 is configured to support such operations. In one embodiment, the pick queue 400 includes an instruction array 410, age matrix 430, a dependency matrix 440, and circuitry 401 configured to control various aspects of the pick queue 400. Instruction array 410 may be used for maintaining status and characteristics of decoded and renamed instructions. Age matrix 430 may be used for hardware resource allocation and instruction age tracking. Dependency matrix 440 may be used for dataflow ordering.

A single entry of the pick queue 400 may comprise corresponding entries in each of the instruction array 410, age matrix 430, and dependency matrix 440. For example, a first entry in the pick queue 400 may comprise entries 432a, 412a, and 442a. A second entry in the store queue 400 may comprise entries 432b, 412b, and 442b, and so on. In general, the pick queue 400 may be responsible for scheduling multiple instructions each clock cycle for execution.

One task of an instruction pick operation regarding dataflow ordering utilizes the instruction array 410 and the dependency matrix 440. The instruction array 410 in FIG. 3 comprises a plurality of entries 412, wherein each entry 412 may correspond to a decoded and renamed instruction. As used herein, elements referred to by a reference numeral followed by a letter may be collectively referred to by the numeral alone. For example, entries 412a-412n may be collectively referred to as entries 412. In one embodiment, each entry 412 includes an entry number 420, a valid field 422, a picked field 424, a trigger field 426, and an instruction status field 428. Although the fields are shown in this particular order, other combinations are possible and other or additional fields may be utilized as well. The bits storing information for the fields 420-428 may or may not be contiguous. Similarly, the arrangement of instruction array 410, age matrix 430, and dependency matrix 440 array may use other placements for better design trade-offs.

In one embodiment, the entry number 420 corresponds to the position of an entry in the pick queue 400, wherein entry 0 may be configured to be at the top of instruction array 410 or at the bottom depending on logic preferences. The entry field 420 may be implied rather than an actual stored number. In one embodiment, pick queue entries may be dynamically allocated in a previous (e.g., renaming) pipe stage. The valid field 422 for a queue entry is updated with a value to indicate a valid entry when the entry is allocated. As will be discussed further, a pick queue entry may be deallocated upon instruction completion if, for example, no load/store hazards exist for the corresponding pick queue entry. The valid field 422 may be reset to a value indicating an empty entry when the entry is deallocated.

Picked field 424 may be used to indicate a corresponding instruction has been picked. Also, the picked field 424 may be used to ensure the corresponding instruction is not subsequently re-picked. Between a first clock cycle when a particular instruction is picked and a second clock cycle when the particular entry is deallocated, the particular instruction is not re-picked due to a set value in the picked field 424. In various embodiments, between the first and second clock cycles, the particular instruction may be disqualified as being ready during pipe stage Pick 304. The trigger field 426 may allow a younger dependent instruction to be picked prior to an older instruction that it depends on completing its operation as shown in FIG. 2B. The status field 428 may contain additional information regarding the corresponding instruction.

Figure 4:
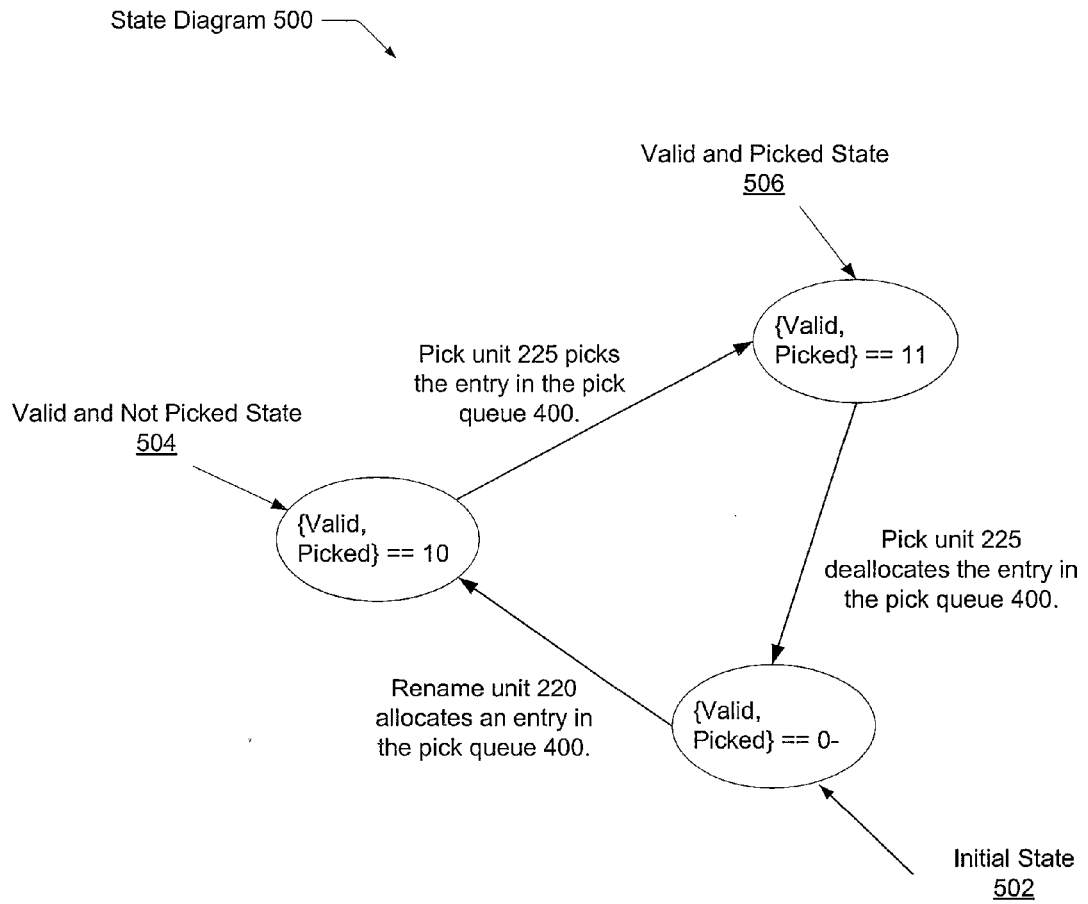
FIG. 4 is a generalized state diagram illustrating one embodiment of the assertion of the valid and picked signals corresponding to a decoded instruction in the pick queue.

Referring to FIG. 4, one embodiment of a state diagram 500 for the valid field 422 and the picked field 424 is shown. In one embodiment, the fields 422 and 424 are each single bits with an initial reset value of logic 0. Those skilled in the art will appreciate other embodiments for representing states and reset values are possible, and such embodiments are contemplated. An initial state 502 comprises the Boolean value {0-} for the two fields. The initial state 502 corresponds to an entry in the pick queue 400 that is not allocated. In one embodiment, a rename unit 220 allocates an entry in the pick queue 400. Accordingly, state diagram 500 transitions to state 504 which corresponds to a valid and not picked state. Here, the Boolean value for the two fields is shown as {10}.

Subsequently, when the pick unit 225 picks the particular entry in the pick queue 400, state diagram 500 transitions to state 506 which corresponds to a valid and picked state. The corresponding Boolean value for the two fields is {11}. In this state, the corresponding instruction may not be re-picked due to instruction-ready logic that receives this Boolean value as an input and disqualifies the corresponding instruction. In one embodiment, the instruction-ready logic is implemented with dynamic logic to be further described shortly. When the corresponding instruction has no existing impediment to deallocation (e.g., it has no load or store operation hazard), pick unit 225 may deallocate the instruction from the pick queue 400. In this case, state diagram 500 returns to initial state 502.

Returning back to FIG. 3, as noted the trigger field 426 may allow a younger dependent instruction to be picked prior to an older instruction that it depends on to complete its operation as shown in FIG. 2B. In one embodiment, the pick unit 225 may set the trigger field 426 to indicate a corresponding picked instruction has produced results or is going to produce results at a deterministic clock cycle in at least one of two ways. These two ways may be referred to as internal triggers and external triggers. Internal triggers are generated within the pick unit 225 when the timing of result generation is known. One example is a load instruction hit case. External triggers are generated when the timing of result generation is not known. One example of an external trigger is a load instruction miss case that waits for the load store unit to complete a cache line fill transaction.

Figure 5:
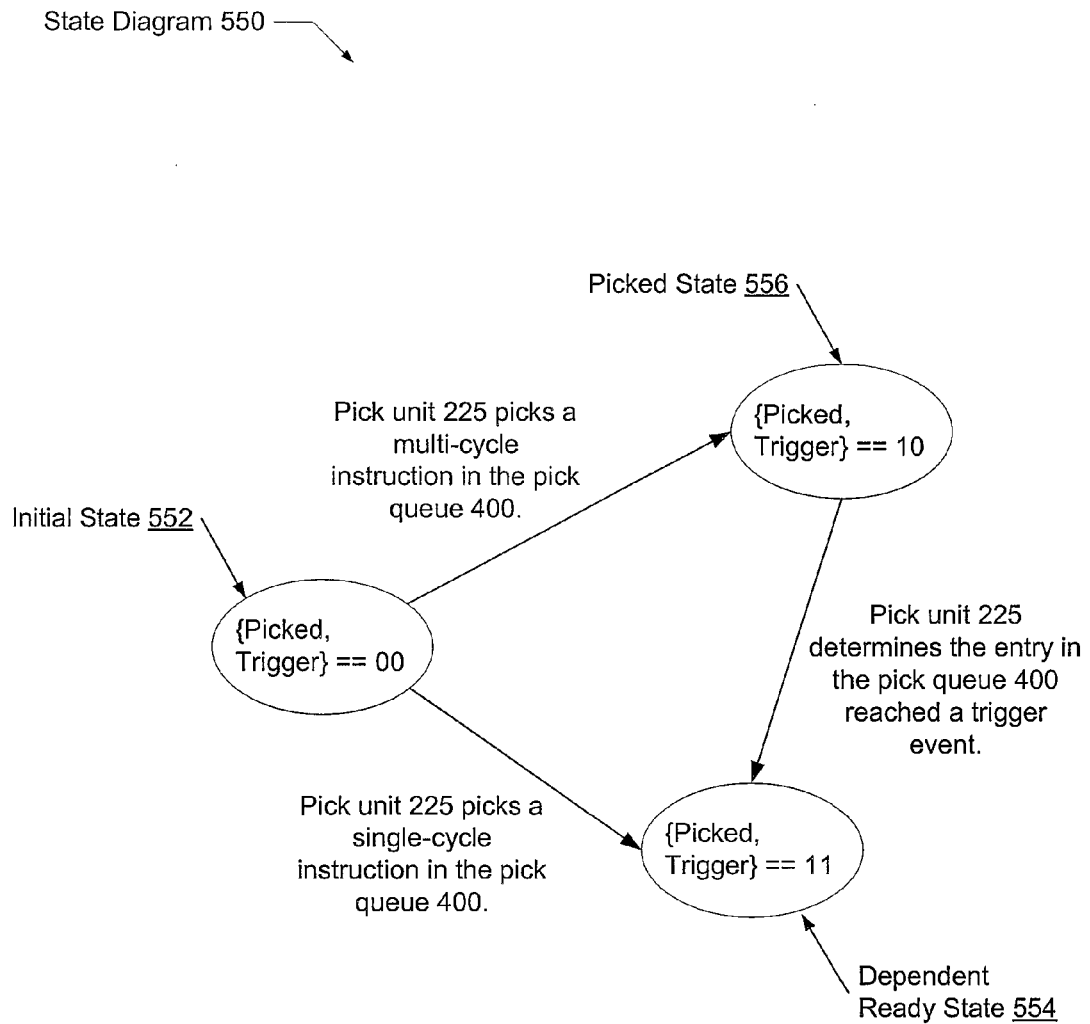
FIG. 5 is a generalized state diagram illustrating one embodiment of the assertion of the picked and trigger signals corresponding to a decoded instruction in the pick queue.

FIG. 5 depicts one embodiment of a state diagram 550 for the picked field 424 and the trigger field 426. In the embodiment shown, the fields 424 and 426 are each a single bit with an initial reset value of logic 0. An initial state 552 comprises the Boolean value {00} for the two fields. The initial state 552 corresponds to a valid entry in the pick queue 400 that is not yet picked and triggered. As an example, in one embodiment the pick unit 225 picks an entry in the pick queue 400 that stores a single-cycle instruction. Accordingly, state diagram 550 transitions to the state 554 that corresponds to a dependent ready state. Here, the Boolean value for the two fields is {11}. Any younger instructions dependent on this particular instruction may now be determined to be ready and possibly picked. Alternatively, the pick unit 225 may pick an entry in the pick queue 400 that stores a multi-cycle instruction. Accordingly, state diagram 550 flows to state 556 that corresponds to a picked state. Here, the Boolean value for the two fields is {10}. Any younger instructions dependent on this particular instruction may not be determined to be ready and possibly picked. When the pick unit 225 determines the entry in the pick queue 400 reaches a trigger event, which may be a predetermined number of clock cycles after the multi-cycle instruction was picked, the state diagram 550 may transition to dependent ready state 554.

In one embodiment, the pick unit 225 may handle multi-cycle instructions in the FGU 255 pipeline differently from multi-cycle load operations. Recall that an instruction in the pick queue may be considered ready if it is not dependent on any other instructions in the pick queue or if instructions it is dependent on have been picked and triggered. The former case applies to multi-cycle FGU 255 instructions. The latter case applies to multi-cycle load instructions. A multi-cycle FGU 255 instruction that has been picked may generate results at a predetermined clock cycle. Multi-cycle FGU 255 instructions may include integer and floating-point (FP) instructions executed on the FGU 255 pipeline. Unless a pipeline flush occurs, such as for an exception, latency for the generation of the result of the multi-cycle FGU 255 instruction is known. Therefore, a corresponding entry within the pick queue 400 may be deallocated between the cycle the multi-cycle FGU 255 instruction is picked and the cycle of the generation of the corresponding result.

The deallocation described above may allow younger dependent instructions to be picked and begin execution just-in-time to receive the corresponding generated result data of the multi-cycle FGU 255 instruction. In contrast, a multi-cycle load instruction is not deallocated from the pick queue 400 when it is picked. This load instruction may later miss in the data cache. Therefore, a multi-cycle load instruction utilizes the trigger field 426, and not deallocation from the pick queue 400, in order to allow younger dependent instructions to be picked and to begin execution just-in-time to receive the corresponding generated result data.

In one embodiment, the pick queue 400 supports the speculative pick and issue of certain instructions such as a load operation. For load instructions, the corresponding trigger bit 426 may be set a predetermined number of cycles after the load is picked. This predetermined number may be based on the assumption that the load instruction hits in the data cache. The setting of this trigger bit 426 may allow younger dependent instructions to be subsequently picked. If the load instruction misses in the data cache, all of the corresponding dependent instructions may replay, or be re-picked by the pick queue 400 for execution at a later time, such as when the load miss data is returned from the memory subsystem. Upon detecting a load miss, the corresponding picked 424 and trigger 426 bits of the load instruction may be set to {1,0}. The corresponding picked 424 and trigger 426 bits of the dependent instructions may be set to {0,0}. In this state, the dependent instructions may not be picked to issue and execute since the original load instruction is picked and not yet triggered. Once the load miss completes, the corresponding fields 424 and 426 of the load instruction may be set to {1,1} allowing the dependent instructions to be possibly picked.

For certain cases such as data translation look-aside buffer (d-TLB) misses, it may be desirable to replay the load or store instruction that caused the TLB miss as well as any dependent instructions. In this case, the corresponding bits 424 and 426 of the original load or store instruction may be set to {0,0} upon completion of the d-TLB miss.

Returning to FIG. 3, the status field 428 may contain additional information regarding the corresponding instruction. One example is a stalled bit that when asserted prevents the corresponding entry from being picked. This stalled bit may be used to remove instructions from instruction pick consideration while allowing other instructions stored in the pick queue 400 to be considered for instruction pick for a given hardware resource.

The stalled bit allows the pick unit 225 to inject "holes" into the pipeline for execution units as required. In certain cases, the LSU 245 may need "holes" in order to service cache line fill transactions and complete load misses. In order to generate a "hole" for the LSU 245, the pick unit 225 may generate a 40-bit stalled mask for a 40-entry pick queue 400 during a prior clock cycle before the "hole" generation. Other mask and pick queue sizes other than 40 bits are possible and contemplated. This 40-bit stalled mask for a 40-entry pick queue 400 may have set bits for stored instructions in the pick queue 400 and for instructions being written to the pick queue 400 in the current cycle corresponding to particular hardware resources or a group of hardware resources, such as LSU 245 or a group of resources containing LSU 245.

This 40-bit mask may ensure no memory reference instruction will be picked the following cycle. The MMU 270 may generate a 3-cycle stall when it is reloading the data translation-lookaside-buffer (d-TLB). Also, the FGU 255 may need "holes" to be injected in order to finish long latency operations such as a divide operation. In this case, a stalled mask may be generated with logic 1's in locations of the mask corresponding to floating-point (FP) instructions in the pick queue 400. The generated results of these FP instructions may be for both instructions already stored in the pick queue 400 and for instructions being written to the pick queue 400 in the current cycle. Therefore, it may be ensured that no FGU instructions with a valid destination will be picked the following cycle. The described conditions and other contemplated conditions for stalls may be combined in a logical OR operation to produce a final stalled bit to be stored in the instruction status field 428.

Another example of information stored in the instruction status field 428 may be a single bit that is asserted when it is known the corresponding instruction is an instruction type that produces results in a single cycle. For example, it may be known that an integer arithmetic instruction is able to produce a result in a single execution clock cycle.

A third example of a sub-field within the instruction status field 428 may be an enable bit that enables the use of the trigger bit. This enabled bit may be used to avoid forwarding of results from a cryptographic operation. A resource tag corresponding to the instruction stored in the entry may be also held in the instruction status field 428.

In one embodiment, pick queue 400 may be implemented as a unified queue. As stated earlier, a processor core 100 comprising a pick queue 400 may be configured to perform dynamic multithreading. It may not be desirable to instantiate on-chip a separate pick queue 400 for each thread due to on-chip real estate constraints. Also, a single pick queue 400 divided evenly among the maximum number of supported threads, wherein the subdivisions incorporate static allocation, may be inefficient.

For example, if processor core 100 is configured to concurrently execute 8 threads and pick queue 400 has 40 total entries (or 40 entries 412, 40 entries 432, and 40 entries 442), then, in one embodiment, 5 pick queue entries support each thread. Alternatively, a separate 5-entry pick queue may exist for each thread. However, each of the 5 entries in these examples for a particular thread may not be fully utilized or may not be utilized at all, as the particular thread may not be scheduled with work. Another thread, on the other hand, may be utilizing all 5 of its pick queue entries and may need more in order to not experience stalls. Therefore, it may be more efficient and provide higher performance to use dynamic allocation of a unified pick queue 400. In one embodiment, a design tradeoff with dynamic allocation of pick queue entries is the entries do not provide an indication of an ordering among the instructions.

The purpose of maintaining dataflow ordering among the instructions stored in the pick queue 400 is to observe when results are generated and identify instructions that are ready for execution. In one embodiment, content addressable memories (CAMs) may be used within the pick queue to maintain dataflow ordering. The result tags, which may simply be a physical register number, of older (in the pipeline) instructions that have completed execution are broadcasted on a set of result buses, one for each functional unit with a writeback port. Each set of result buses may be connected to comparators, such as xnor gates, at each entry within the pick queue. These comparators allow instructions to determine if their sources match the results being generated. When all of an instruction's sources are ready, the instruction as a whole is considered ready. However, CAMs consume an appreciable amount of both on-chip real estate and electrical power.

In another embodiment, rather than use CAMs to broadcast results, a dependency matrix 440 such as that shown in FIG. 3 may be used. A dependency matrix 440 has one row and one column for every instruction in the pick queue 400. Each cell may hold one bit of state representing whether an instruction assigned to a particular row, or entry 442, is waiting on a dependency from an instruction assigned to a particular column. The bit vectors stored in rows 442 may be set via allocation comparators, which may place a logical high value in the row if the corresponding column produces a corresponding result tag. In one embodiment, as older (in the pipeline) instructions are deallocated from the pick queue 400, a corresponding column is cleared (i.e., set all bits in the column to a logic low value).

The deallocation of speculative instructions, such as load and store instructions, and dependent instructions of the speculative instructions may be handled differently from other instructions. For example, each store operation within processor core 100 may be considered to be a speculative operation in the sense that a miss to a data translation lookaside buffer (d-TLB) may arise during execution of the store instruction by the LSU 245. Similarly, each load operation within processor core 100 may be considered to be a speculative operation in the sense that a miss to the d-TLB, a miss to the data cache, or a read-after-write (RAW) data hazard may arise during execution of the instruction by the LSU 245. When a miss or hazard arises during execution of a load or a store instruction, the pick unit 225 may support various levels of replay capability for dependent instructions after the load instruction. The pick unit 225 may undo a predetermined number of instruction pick clock cycles and subsequently replay the dependent instructions. In one embodiment, independent instructions may not be replayed.

Due to load and store instruction speculation, corresponding entries 442 may not be immediately deallocated in the pick queue 400 once an instruction is picked. The picked bit 424 is used to ensure that the corresponding entry 442 is not re-picked between the cycle an instruction is picked and the cycle an instruction is deallocated from the pick queue 400. Younger dependent instructions in the pick queue 400 may not be picked unless the trigger bit 426 of the corresponding older (in program order) instruction is set.

Figure 6:
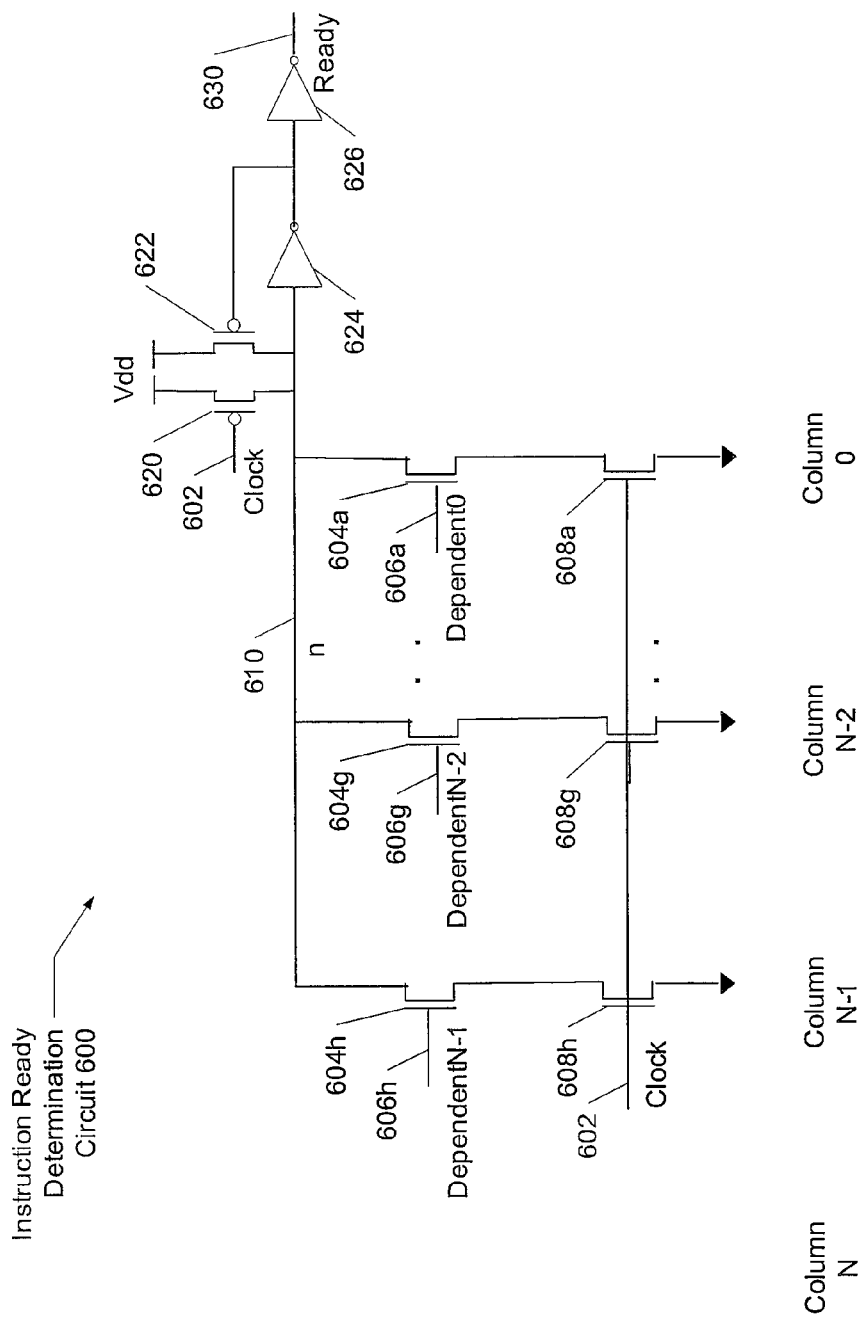
FIG. 6 is a generalized block diagram illustrating one embodiment of circuitry for finding ready instructions in a pick queue.

Referring now to FIG. 6, one embodiment of an instruction ready determination circuit 600 is shown. Those skilled in the art will readily understand the operation of dynamic logic. The signal clock 602 may be used as a precharge signal on pmos transistor 620. Also, the signal clock 602 may be coupled to the cutoff footer nmos transistors 608*a*, 608*g*, and 608*h*. Inverters 624 and 626 buffer and couple the dynamic node n 610 to the output signal ready 630. The pmos transistor 622 may be used as a keeper device.

Each nmos transistor 604 may be coupled via signal 606 to a separate column of a corresponding dependency matrix entry 442. Dynamic circuit 600 may be used to determine whether a particular instruction stored in the pick queue 400 may be placed in a pool of ready instructions. Initially, the output ready 630 of inverter 626 conveys a binary logic value of 1 during the end of a precharge phase of circuit 600. In another embodiment, only inverter 624 may be used to convey ready 630 and an initial logic value of 0, which indicates the entry is not ready.

During an evaluation phase of circuit 600, when a row is entirely clear of dependencies, or a wired-logical-OR on node n 610 provides no discharge, ready 630 remains high. Therefore, the particular instruction is to be placed in a pool of ready instructions for the second half of the instruction pick process. Here, it is noted circuit 600 corresponds to entry N of the dependency matrix 440. An instruction cannot be dependent on itself, so a logic 0 for the corresponding column N is the same as not placing corresponding transistors for column N. For entry N−1 of the dependency matrix 440, column N−1 would be empty and column N would have two nmos transistors 604 and 608.

Figure 7:
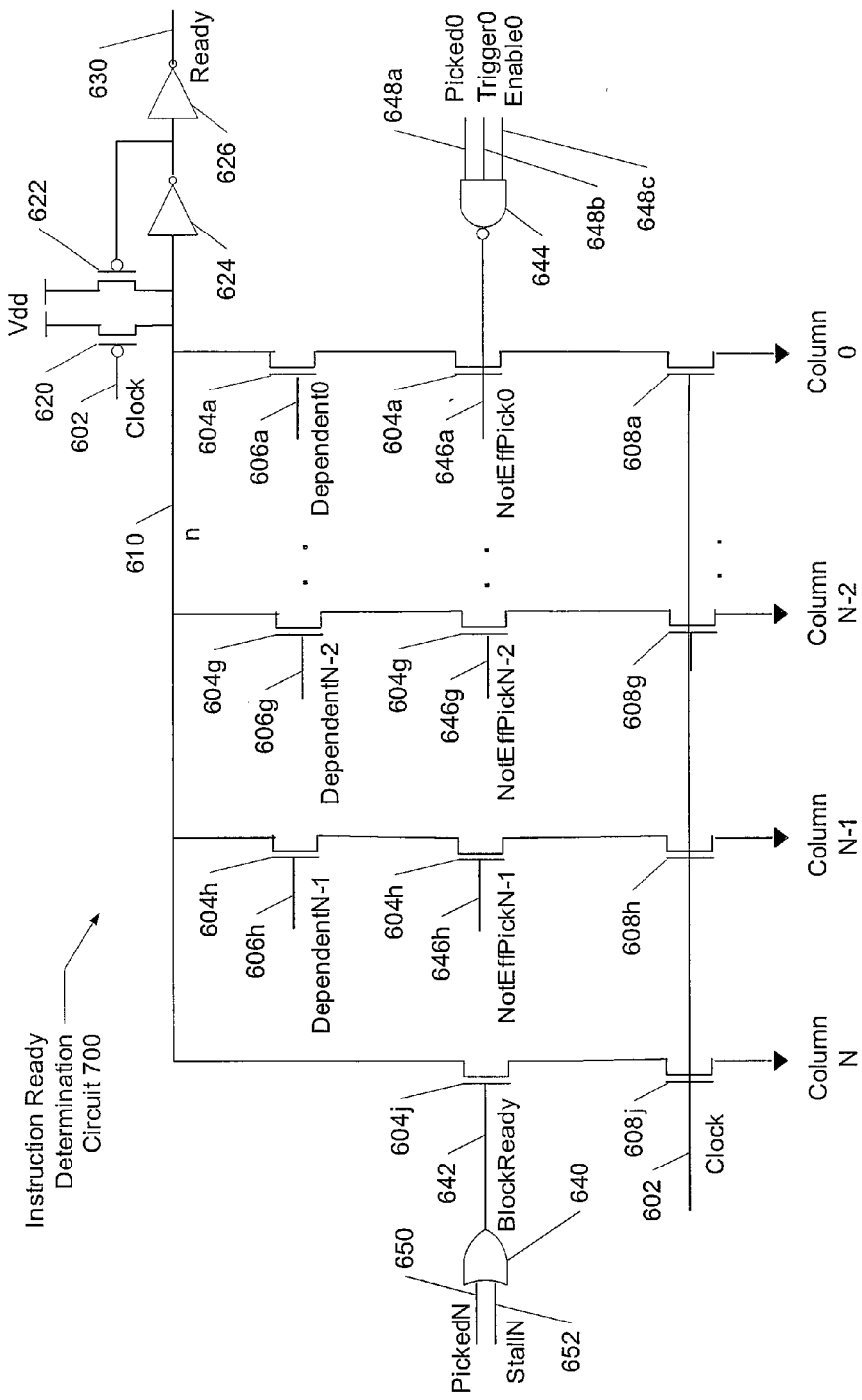
FIG. 7 is a generalized block diagram illustrating another embodiment of circuitry for finding ready instructions in a pick queue.

Turning now to FIG. 7, another embodiment of an instruction ready determination circuit 700 is shown. Circuit elements similar to elements in FIG. 6 are numbered accordingly. Circuit 700 corresponds to entry N of the pick queue 400. Those skilled in the art will readily ascertain that there are many ways in which the logic of FIG. 6 and FIG. 7 may be implemented to accomplish the same task.

For each column N−1 to 0 in FIG. 7, the series combination of nmos transistors 606 and 646 corresponds to a logical AND of their inputs. Taking nmos transistor 646*a* as an example, a NAND gate 644 conveys a signal NotEffPick0 to the gate input of transistor 646*a*. The series combination of the signals Picked0 648*a*, Trigger0 648*b*, and Enable0 648*c* may generate an Effectively Picked value that is logically inverted by the NAND gate 644. A description of these three signals is provided below.

An asserted input value Picked0 648*a* corresponds to the instruction in entry 0 of the pick queue 400 having already been picked in an earlier cycle. In one embodiment, this value may be from the stored value in Picked field 424 of entry 0 of pick queue 400. In this case the instruction in entry 0 has already been picked in an earlier cycle. An asserted input value Trigger0 648*b* corresponds to the instruction in entry 0 of the pick queue 400 having been triggered in an earlier cycle. In one embodiment, this value may be from the stored value in Trigger field 426 of entry 0 of pick queue 400.

An asserted input Enable0 648*c* corresponds to the instruction in entry 0 of the pick queue 400 having its corresponding Trigger0 648*b* bit enabled. In one embodiment, each Trigger 648*b* for each column N−1 to 0 in the example shown is qualified with a corresponding Enable 648*c* bit. This qualification allows suppression of normal triggering for cases where a source operand for a store operation or a floating-point operation comes from a cryptographic operation. In one embodiment, the cryptographic pipeline is 3 clock cycles and overlays the FGU 255 pipeline. There may be internal forwarding buses to allow cryptographic operations to forward to other cryptographic operations. These types of dependencies may be triggered every 3 cycles. These forwarding buses may not be routed to the rest of the FGU 255 or to the LSU 245.

In the case Picked0 648*a*, Trigger0 648*b*, and Enable0 648*c* are all asserted, a logic value 0 is conveyed to the gate input of transistor 604*a*. If the signal Dependent0 606*a* is asserted, which means the instruction in entry N of pick queue 400 is dependent on the instruction in entry 0 of the pick queue 400, then the dynamic node n 610 is not discharged by column 0. In other words, with respect to the dependency of the instruction in entry N on the instruction in entry 0, if the instruction in entry 0 has already been picked and triggered, then the instruction in entry N may be determined to be ready. As shown with examples regarding the pipe stages in FIG. 2B, the result of the instruction in entry 0 may not have been generated yet, but the dependent instruction in entry N may be a candidate to be picked in this current clock cycle.

However, if the instruction in entry N is also dependent on the instruction in entry N−2 and the instruction in entry N−2 has not been picked yet or has not been triggered yet, then a logic value 1 may be asserted on both nodes 606*g* and 646*g*. Accordingly, the dynamic node n 610 is discharged and the instruction in entry N is not a candidate to be picked in this current clock cycle. Although determination circuit 700 has an extra nmos transistor 646 in each column N−1 to 0 compared to determination circuit 600, circuit 700 may allow instructions to be candidates for being determined ready in an earlier pipe stage.

In addition, determination circuit 700 has nmos transistors 604*j* and 608*j* in column N, whereas determination circuit 600 has no circuitry for column N. In circuit 700, the corresponding instruction stored in entry N of pick queue 400 may be disqualified for being a candidate for being determined ready for other reasons other than being dependent on other instructions. For example, the corresponding instruction may have already been picked. Therefore, the value stored in Picked field 424 of entry N may hold a logic value of 1. This value may be asserted on PickedN 650, which causes BlockReady 642 to be asserted. Then the series combination of nmos transistors 604*j* and 608*j* discharge dynamic node n 610 and Ready 630 transitions from a logic high value to a logic low value.

It is noted that the disqualification provided by logic OR gate 640 and its corresponding inputs does not add a series gate delay to the determination of the Ready 630 value. Each entry of pick queue 400 may have corresponding circuitry as logic OR gate 640 and nmos transistors 604*j* and 608*j* in a column number matching the entry number. Alternatively, the Ready 630 value may be disqualified further down the logic for picking instructions. However, a series gate delay may need to be added to this logic path that may be already setting the critical path of processor core 100.

The signal StallN 652 may also be used to disqualify the instruction in entry N from being a candidate for being determined ready for an instruction pick. As described above regarding FIG. 3, a stalled bit may be stored in status field 428. Several described conditions are provided for setting stalls in the pipeline, which may be combined in a logical OR operation to produce a final stalled bit to be stored in the instruction status field 428.

In addition, a timing condition may be also combined in the logical OR operation that may disqualify the instruction in entry N from being ready. Alternatively, this timing condition may assert a separate signal that is input to logic OR gate 640. This timing condition may be affected by a consumer instruction in a producer-consumer pair. For example, a latency between two instruction types, such as a floating-point arithmetic type as a producer and an integer arithmetic type as a consumer, may not have a consistent latency.

In one example, five combinations of these producer-consumer pairs may include 14 clock cycles of latency. Referring to FIG. 2B, an issue stage may use 1 clock cycle, the producer may use 12 clock cycles for execution, and the generated result may be available in the following clock cycle. If the producer is picked in clock cycle 5, then the generated result will be available in clock cycle 19 (5+1+12+1). The corresponding Trigger bit for the producer may be set in clock cycle 17 (19−1−1). The two clock cycles subtracted from clock cycle 19 correspond to the single Picked clock cycle and the single Issue clock cycle for the consumer instruction.

However, an additional sixth combination of this producer-consumer pair may include 16 clock cycles of latency, since it may not be able to forward results in a manner similar to the other five instructions within the instruction type. In other words, the latency of a producer-consumer pair may be a function of both the producer and consumer instructions. This inconsistency may be due to processor cores with result forwarding hardware between a restricted set of functional units. In these processors the latencies from the same source instruction may be different, depending on the type of producer functional unit and the consumer functional unit.

Referring again to FIG. 2B, the producer may use 14 clock cycles for execution, and the generated result may be available in the following clock cycle. If the producer is picked in clock cycle 5, then the generated result will be available in clock cycle 21 (5+1+14+1). The corresponding Trigger bit for the producer may be set in clock cycle 19 (21−1−1). The two clock cycles subtracted from clock cycle 21 correspond to the single Picked clock cycle and the single Issue clock cycle for the consumer instruction.

In order that a consumer not be picked too early and may not arrive at a functional hardware resource without available source operands, each of the six combinations of this producer-consumer pair may be set to have a latency of 13 clock cycles, rather than 11 clock cycles. Processor performance may significantly decrease in such a case.

Alternatively, logic for a consumer may determine the consumer has a different timing from other consumers dependent on a particular producer—such as the sixth combination in the above example. Opcodes of the producer and consumer and allocation comparators used to set corresponding bits in the dependency matrix 440 may be used to determine which consumer has the longer latency. Also, a table may be used to store producer-consumer pair timings. The difference in latency, such as 2 clock cycles in the above example, may be stored. Then, in the above example, the producer may use the reduced value (12 clock cycles of latency instead of 14 clock cycles) to assert its corresponding Trigger bit following being picked. The first five consumers may be determined to be ready for an instruction pick in the same clock cycle the corresponding Trigger bit is asserted, since both the Picked 424 and Trigger 426 of the producer are asserted. Referring again to FIG. 7, this determination may be made with nmos transistors 606 and 646. However, the sixth consumer may assert a delay signal that is input to logic OR gate 640 of determination circuit 700. Alternatively, the sixth consumer may combine an asserted delay signal with other stall signals in a logic OR operation. Therefore, logic OR gate 640 conveys a logic high value on BlockReady 642 and nmos transistor 604*j* discharges dynamic node n 610. The sixth consumer is disqualified from being determined to be ready in this clock cycle.

In one embodiment, the 2 cycle difference between the sixth consumer and the other five consumers may be counted down. The above logic operations may repeat and the sixth consumer is disqualified again due to the asserted BlockReady 642 signal. The difference may be decremented again, and in the following clock cycle, the BlockReady 642 signal may not be asserted and the sixth consumer may be determined to be ready for an instruction pick. Now the sixth consumer may not be picked early and the other five consumers may not be penalized by 2 additional clock cycles before they are determined to be ready for an instruction pick.

Turning now to FIG. 8, one embodiment of a table of latencies 900 for inconsistent producer-consumer pairs is shown. Table 910 shows an example of 4 general consumer instructions dependent on a same general producer instruction. This producer instruction is picked in clock cycle 10. The pipeline for this example has a 3-cycle Issue stage. The producer-consumer latency for the first three consumers is 5 clock cycles. The latency for the fourth consumer, Consumer3, is larger with 7 clock cycles. This difference may be due to the functional units used and the existence of any result forwarding hardware.

These latencies may be used to determine the clock cycle the generated result of the producer instruction is available for use. For the first three consumer instructions, the calculated clock cycle may be used to work backwards and determine the appropriate clock cycle the producer's corresponding Trigger bit 426 may be asserted for just-in-time execution. Here, clock cycle 15 is determined after subtracting the number of cycles used by the Pick and Issue stages. A determination is not calculated for the fourth consumer instruction. Rather, the producer may assert the Trigger bit 426 in the same clock cycle as for the other three consumer instructions. The known predetermined difference in clock cycles between the two groups of consumer instructions may be used to delay the fourth consumer instruction from being picked. For example, an asserted delay signal may be conveyed to the logic OR gate 640 for two clock cycles aligned with the assertion of the producer's trigger bit 426. Therefore, the first three consumer instructions are not penalized by the two cycle difference with the fourth consumer instruction, Consumer3. Also, the fourth consumer instruction is not picked too early.

Once a pool of instructions is determined to be ready for an instruction pick, the next step is to pick instructions from this pool based on hardware resource groupings, or slots. A slot may correspond to one or more functional units such as a load/store unit (LSU) 245, an integer execution unit 235 or 240, a branch unit, cryptographic unit, a floating-point unit 255, or other. Each instruction may be assigned by decode unit 215 to a slot prior to being written into the pick queue 400.

In one embodiment, a slot 0 assignment may correspond to both memory reference address resolutions and integer arithmetic or logical instructions. A slot 1 assignment may correspond to integer arithmetic or logical instructions, branch instructions, floating-point instructions, cryptographic instructions, and integer instructions executed by the floating-point graphics unit (FGU), such as integer multiply and divide instructions. A slot 2 assignment may correspond to store data acquisition operations. Other assignments and number of slots are possible and contemplated. Instruction picking within a slot may be independent of instruction picking within other slots. In order to be picked, an instruction must be the oldest ready instruction for a particular slot.

Each entry in the pick queue 400 has an age vector 432. The age vector 432 may be generated for each instruction during a renaming clock cycle before the instruction is written into the pick queue 400. The age vector 432 may be a bit vector that represents all instructions currently in the pick queue 400 that are older than the instruction being written on a slot basis.

A bit vector block with N bits may be generated to ensure that the oldest ready instruction for each slot is picked each cycle. Each bit of this block vector may represent an entry in the pick queue 400. Each bit of this block vector may be constructed from a logical AND-OR reduction of a corresponding ready vector, which is made up of the values of Ready 630 for each entry, with the corresponding age vector for the entry. In one embodiment, a final pick bit for each entry of the pick queue 400 may be a combination in a logical AND operation of a corresponding Ready 630 value and an inverted corresponding block value. In another embodiment, the valid field 422 may be additionally combined if it hasn't already been combined. In some cases, timing considerations may make stalling a corresponding instruction via the StallN 652 value impractical. For these cases, a corresponding inverted "late_stall" value may be applied as a fourth term in the logical AND operation to determine a final pick bit for each entry in the pick queue 400.

Figure 9:
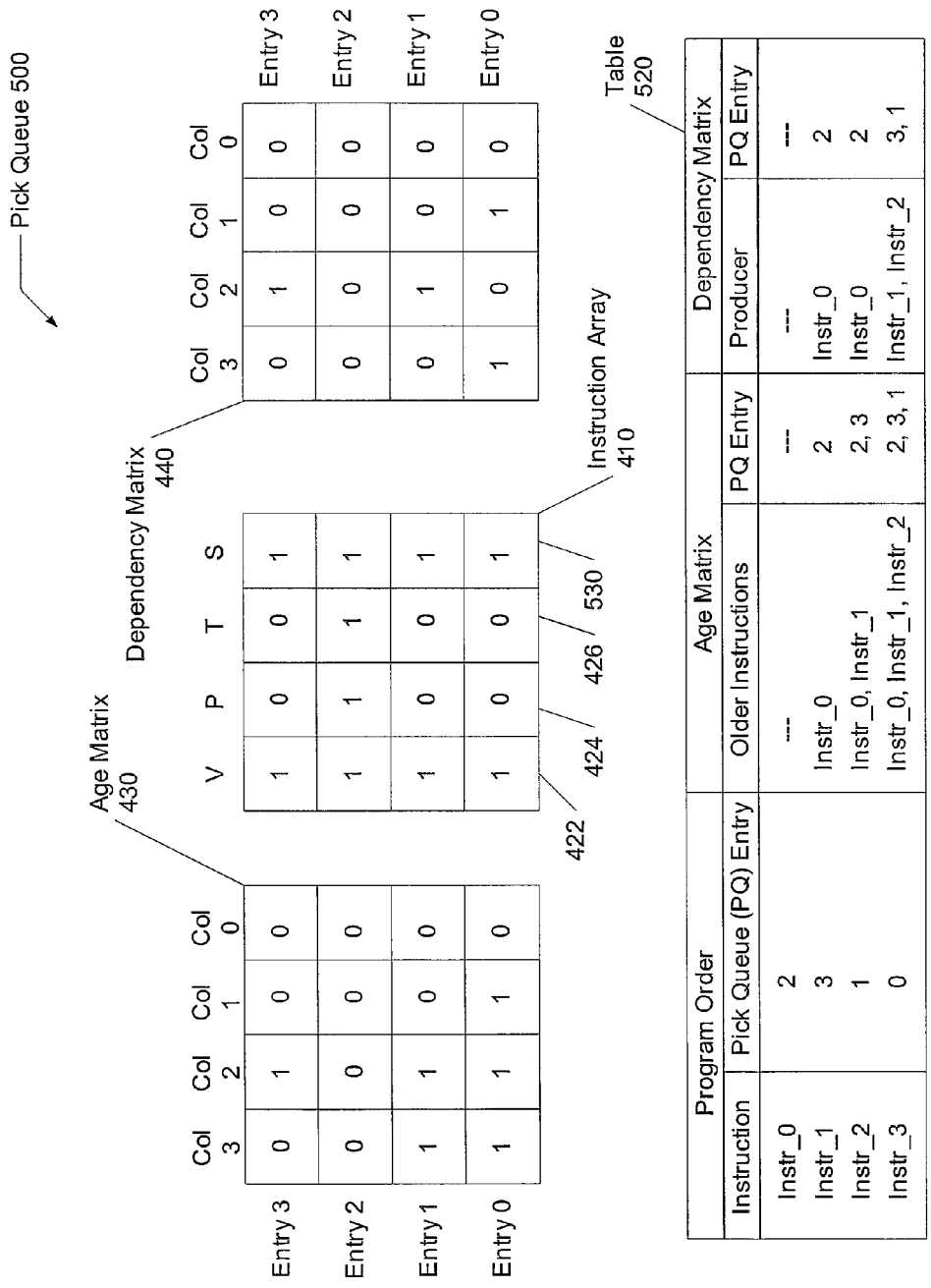
FIG. 9 is a generalized block diagram and table illustrating another embodiment of the entries of a pick queue.

Turning now to FIG. 9, another embodiment of a pick queue 500 demonstrating a sample usage is shown. Here, pick queue 500 has 4 entries. Each of an age matrix 430, an instruction array 410, and a dependency matrix 440 have 4 entries. Table 520 displays the program order of four computer program instructions and the pick queue 500 entry information.

In the age matrix 430, instructions older than a given instruction are stored as a logic value 1 in the corresponding column of the pick queue 500 entry for that instruction. For example, instruction 2 is mapped to entry 1 of the pick queue 500, which has bits set for entries 2 and 3 in the age matrix 430. These entries correspond to instruction 0 and instruction 1. Hence, instructions 0 and 1 are older than instruction 2. For simplicity, the information in Table 520 assumes that all instructions are assigned to the same slot. In practice, multiple slots may be active in the pick queue 500 at the same time. The age matrix 430 is maintained on a slot basis and is used to track the age relationships between all instructions on a slot basis. Bits set in the age vector for a given entry of the pick queue 500 may be instructions that are older than the respective instruction and also mapped to the same slot.

The dependency matrix 440 functions in a similar manner to the age matrix 430. For a given instruction, other instructions it depends on have a logic value 1 stored in the corresponding column of the pick queue 500 entry for that instruction. For example, instruction 2 is mapped to entry 1 of the pick queue 500, which has a logic value 1 stored in column 2. Column 2 corresponds to entry 2, which corresponds to instruction 0. Hence, instruction 2 is dependent on instruction 0. Instruction 2 may not be picked before instruction 0 is picked. Instruction array 410 holds the valid 422, picked 424, trigger 426, and single 530 fields for each of the four instructions.

Figure 10:
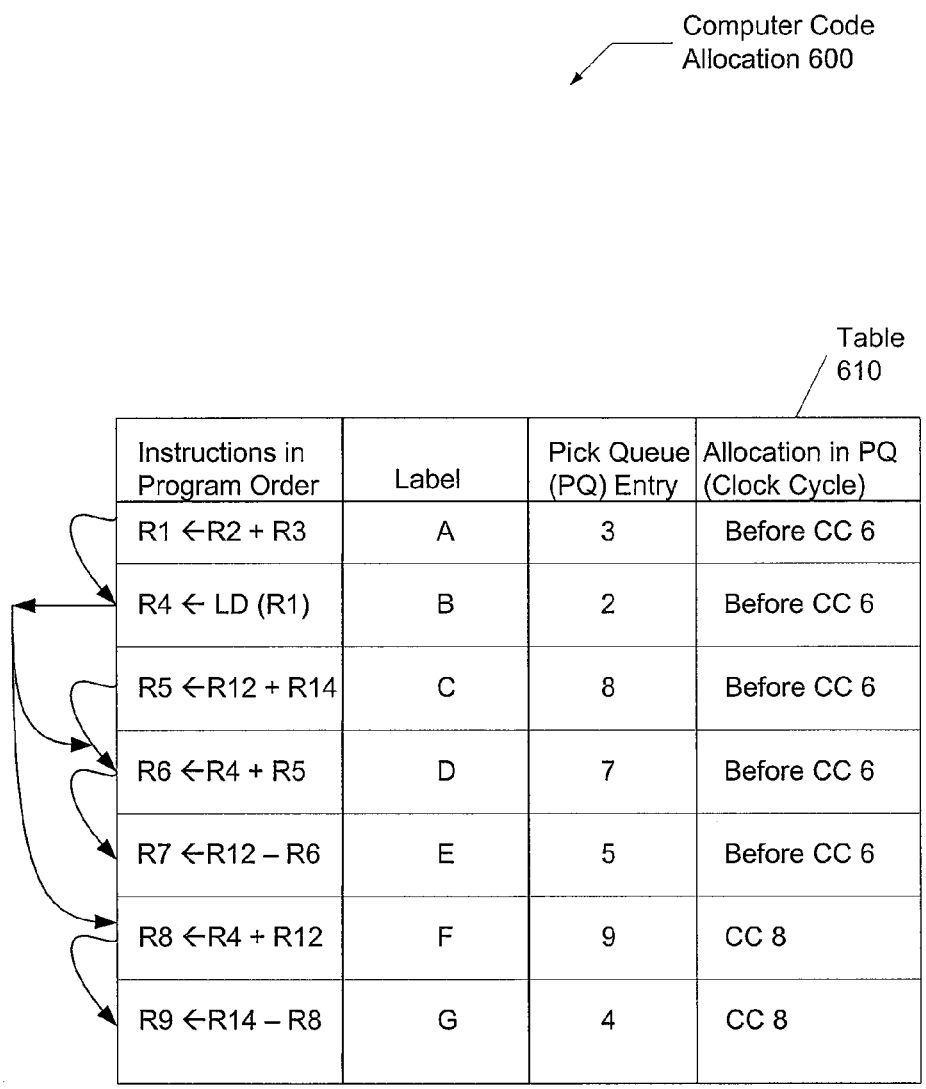
FIG. 10 is a generalized block diagram illustrating one embodiment of a method for the allocation of computer code instructions in a pick queue is shown.

Referring now to FIG. 10, one embodiment of the allocation of computer code instructions 600 in a pick queue is shown. Table 610 illustrates a simple example of computer program instructions, wherein a load instruction (label B) has two direct younger dependent instructions (D and F) and two indirect younger dependent instructions (E and G). Corresponding sample pick queue entries and allocation clock cycles are also shown. The information in table 610 is used in subsequent examples as further described below.

Figure 11A:
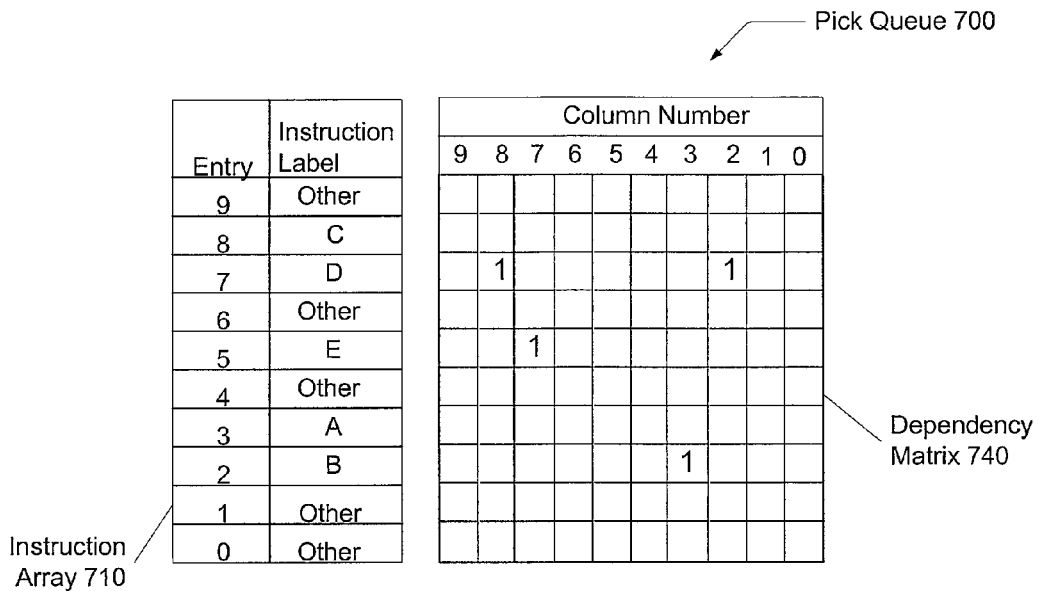
FIG. 11A is a generalized block diagram illustrating one embodiment of computer code allocation within the data queue.

Turning now to FIG. 11A, another embodiment of a pick queue 700 demonstrating a sample usage is shown. Here, pick queue 700 has 10 entries. Each of an instruction array 710 and a dependency matrix 740 has 10 entries. A corresponding age matrix also has 10 entries, but it is not shown in this example. The information stored in the entries corresponds to the program instructions in Table 610 of FIG. 10. In this example, only instructions A-E have been decoded, renamed, and allocated in the pick queue 700. Instructions F and G have not been allocated yet in the pick queue 700. Referring again to FIG. 2B, the clock cycles referred to in Table 610 refer to the clock cycles shown in pipe stages 350. In this example, the load instruction with label B is picked in clock cycle (CC) 5. The corresponding Picked field 424 is asserted in CC 6. In one example, load instructions have a latency of 3 clock cycles for a load hit in the data cache. Accordingly, the Trigger field 426 is asserted in CC 7. This asserted Trigger field 426 is detected in CC 8 wherein younger dependent single cycle integer arithmetic operations may be now picked. These single cycle instructions are issued in CC 9 and ready for execution in CC 10, which overlaps with the writeback stage of the load instruction.

The corresponding dependency information is shown in the dependency matrix 740. For ease of illustration, blanks in entries denote a logic 0 value. A logic 0 value denotes the instruction corresponding to a particular row is not dependent on the instruction corresponding to a particular column. For example, instruction D in entry 7 is not dependent on column 5, or instruction E. However, instruction D is dependent on both columns 8 and 2, or instructions C and B. Also for ease of illustration, entries labeled as "Other" correspond to unallocated entries or allocated instructions that are independent of all other allocated instructions. As stated above, in this example, only instructions A-E have been decoded, renamed, and allocated in the pick queue 700. The information storage in FIG. 11A corresponds to the state of the pick queue 700 prior to CC 6. In this example, instructions F and G are not allocated in the pick queue 700 until CC 8.

Figure 11B:
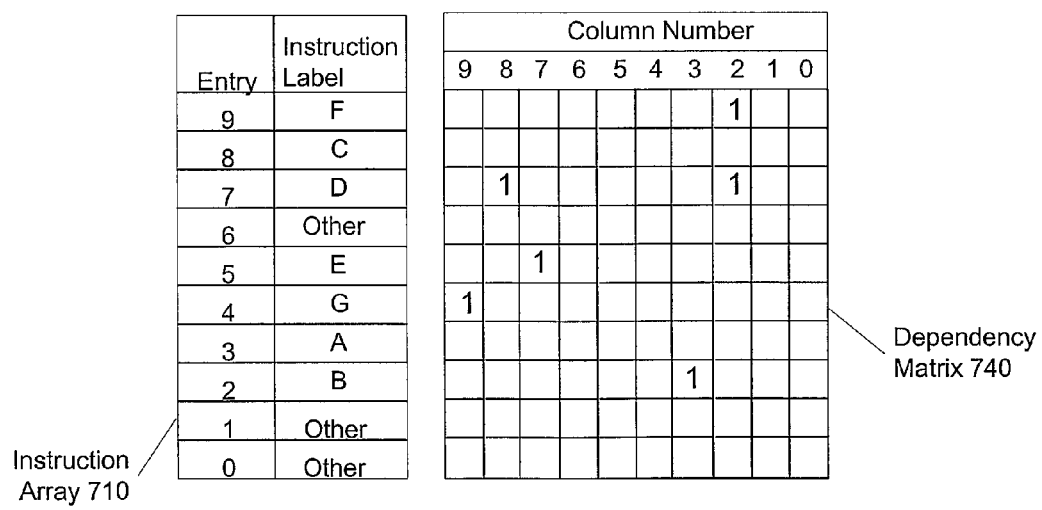
FIG. 11B is a generalized block diagram illustrating another embodiment of computer code allocation within the data queue.
Figure 12:
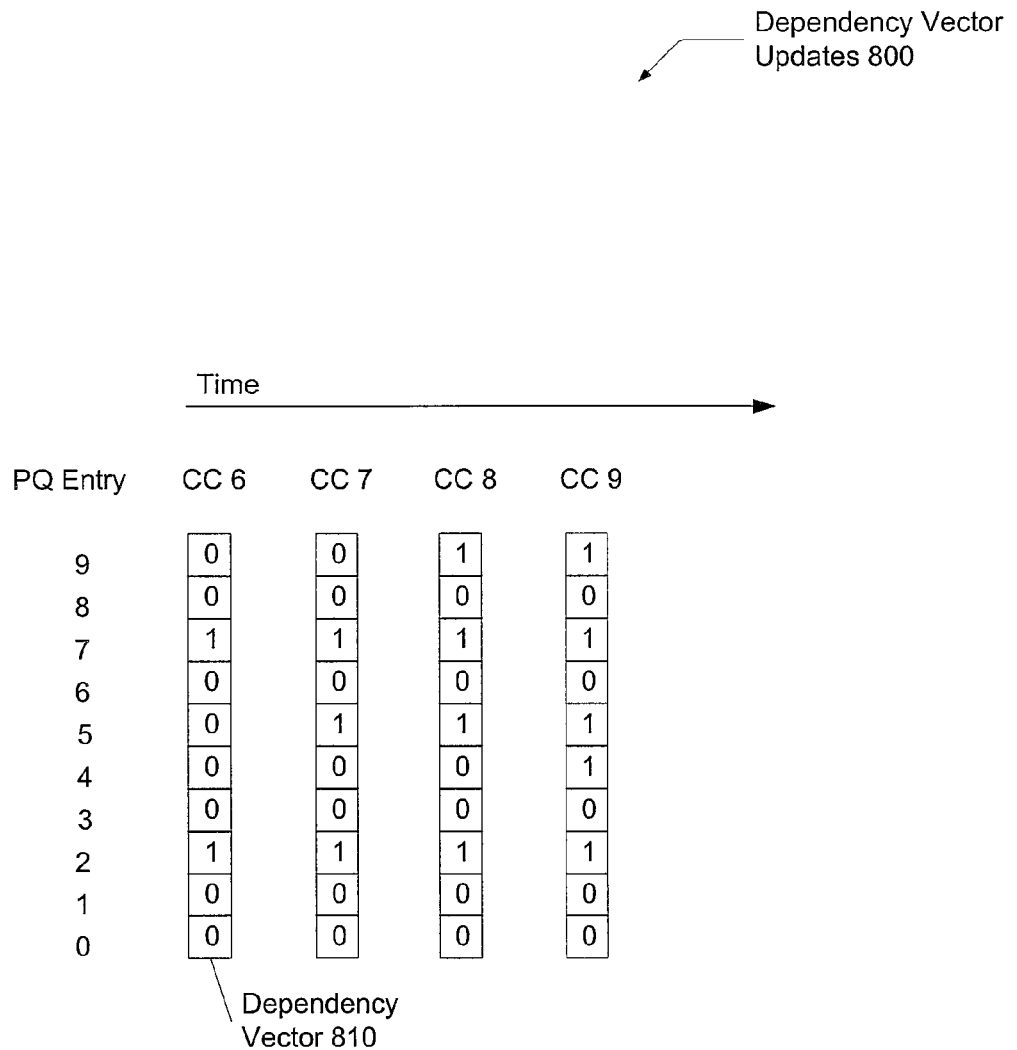
FIG. 12 is a generalized block diagram of one embodiment of dependency vector updates.

Turning now to FIG. 11B, another embodiment of a pick queue 700 demonstrating a sample usage is shown. Here, the information storage in pick queue 700 corresponds to CC 8 in the current example. Therefore, information corresponding to entries 4 and 9 have been updated. Referring to FIG. 12, one embodiment of dependency vector updates 800 is shown. The dependency vector corresponds to the load instruction with label B. As discussed above regarding this example, the load instruction with label B is picked in CC 5. As this determination is more than likely made late in the clock cycle, the asserted Picked field 424 is detected in CC 6.

In one embodiment, in CC 6, a one-hot vector corresponding to the load instruction is routed to each entry of the pick queue 700. Since the load instruction with label B is allocated in entry 2, this one-hot vector comprises 10 bits with a logic 1 value in bit 2. The remainder of the bits of this one-hot vector has a logic 0 value. Circuitry within the pick queue 700 performs a logic AND-OR reduction between this one-hot vector and the dependency information stored in each entry of the dependency matrix 740. For example, for entry 7, or instruction D, the asserted bit 2 of the load one-hot vector combines in a logic AND operation with the logic 1 stored in column 2 of the dependency matrix 740. Therefore, the corresponding dependency vector 810 in FIG. 12 has a logic 1 corresponding to entry 7. The remainder of the bits will be a logic 0 as a result of this logic AND-OR reduction. Any direct dependent instruction of the load instruction is read out. In this example, only instruction D in entry 7 has a corresponding logic 1 generated. The resulting 10-bit result mask is combined with the one-hot vector in a logic OR manner to produce the dependency vector 810 of CC 6 shown in FIG. 12. This dependency vector may be input to sequential storage elements such as flip-flops.

The stored resulting dependency vector 810 may be used in the subsequent clock cycle 7 wherein circuitry within the pick queue 700 performs a logic AND-OR reduction between this stored dependency vector 810 and the dependency information stored in each entry of the dependency matrix 740. Therefore, the next level of instruction dependencies on the load instruction with label B may be found. For example, instruction E in entry 5 is an indirect dependent instruction and it is found in this iteration of the AND-OR combination. The dependency vector for CC 7 in FIG. 12 shows the asserted bit for entry 5.

This process may continue in an iterative pipelined fashion in order to generate a dependency vector with stored values corresponding to 4 cycles of speculative picking after a load instruction is picked. Each load instruction may have a 10-bit dependency vector, for this example, associated with it that represents all instructions that may be directly and indirectly dependent on it. In this manner, all of the dependent instructions may be determined before the load instruction hit/miss status is actually determined.

The dependency vector may take into account instructions written into the dependency matrix 740 after a given load instruction has been picked for execution. For example, in the current example, the load instruction B was picked in CC 5. In CC 8, the dependent instructions F and G may be allocated in pick queue 700. This allocation is reflected in the information update shown in FIG. 11B. Accordingly, the dependency vector 810 is updated in subsequent clock cycles 8 and 9 to also reflect these new allocations. For example, the bit corresponding to entry 9 is asserted in the dependency vector 810 in CC 8 and the bit corresponding to entry 4 is asserted in CC 9. The direct dependent instruction F corresponds to entry 9 and indirect dependent instruction G corresponds to entry 4.

Upon a load instruction miss to the data cache, the corresponding dependency vector 810 may be used to identify younger (in program order) dependent instructions in the pipeline that need to be cancelled. In addition, the dependency vector 810 may be used to reset dependent instructions within the pick queue 700 to allow for subsequent picking once a cache line fill transaction corresponding to the load instruction miss completes. The mechanism described for this example may be used for data translation look-aside buffer (d-TLB) misses and read-after-write speculation. In another embodiment, a dependency matrix copy (DMC) may be used in place of dependency matrix 740 in order to compute a dependency vector for each picked load instruction. The DMC may comprise the same dependency information as the dependency matrix 740. The DMC may be used to avoid impacting any critical timing associated with the picking operation that may need to complete within a single pipe stage.

In one embodiment, the one-hot vector corresponding to the load instruction described earlier is fed into the dependency matrix at approximately the same time that a load triggers any dependent instructions in the pick queue. The same cycle that dependent instructions are being picked from the pick queue, instructions dependent on the load are being calculated. In one embodiment, the pick queue does dependency calculations (e.g., iteratively) each cycle for all unresolved loads. The cycle after an instruction has been picked it is known if it is dependent on a prior load. Instructions dependent on a prior load or loads cannot be deallocated from the pick queue until the prior load or loads resolve.

A special case exists where instructions are being allocated into the pick queue on the same cycle that a related speculative load is being resolved. In this case, it may not be possible to determine whether or not the instructions just written are dependent on the resolving load. In order to handle such a case, the pick queue may stall picking instructions just allocated (e.g., for 1 cycle). In addition, the dependency vector (e.g., matrix entry 442 described above in relation to FIG. 3) of each instruction written into the dependency matrix copy (DMC) is modified to take into account the dependency information of earlier instructions being written. As an example, consider the case where instructions i0, i1 and i2 are written into the DMC in the same cycle. The dependency vector for i1 is modified to be the logical OR of all dependency vectors of earlier instructions, in this case i0. Likewise, the dependency vector for i2 is modified to be the logical OR of all dependency vectors of all earlier instructions, in this case i1 and i2. All three instructions i0-i2 are stalled from being picked the next cycle since a load resolution occurs in the same cycle as the allocation of the instructions into the pick queue. For example, signal StallN 652 may be used for this purpose. During this stall cycle, the pick queue determines which instructions just written are dependent on the resolving load. The derivation of the corresponding dependency vector 810 may be used for this purpose. The pick queue may subsequently reset the instruction state (e.g., picked and trigger bits) as needed responsive to determining a misspeculation occurred. In one embodiment, this can be done in a single cycle since the dependency vector for a given instruction includes the logical OR of all dependency vectors of younger instructions within the group of instructions being written.

Upon a load resolving, the picked and trigger bits of instructions dependent on the resolving load are reset to 0. If a dependent instruction is picked the same cycle that a load is resolved, it is canceled. If a dependent instruction was picked in previous cycle and is in flight, it is canceled as well. Independent operations are allowed to be picked in the same cycle that other dependent operations are being canceled for a given thread. Allowing independent operations to be picked while canceling dependent operations may improve the overall performance of the processor.

Figure 13:
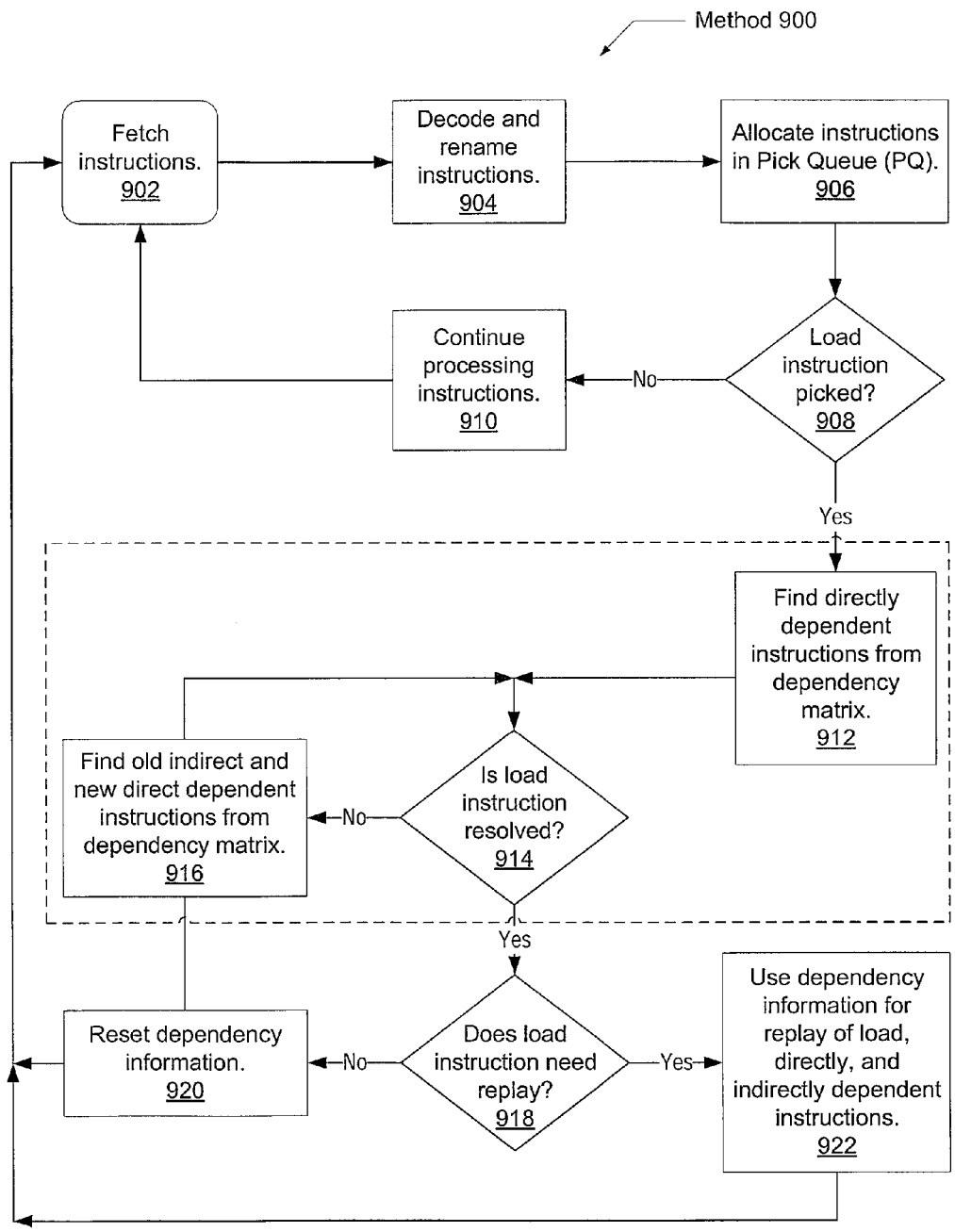
FIG. 13 is a generalized flow diagram of one embodiment of a method for efficient identification of dependent instructions on speculative load operations in a processor.

Referring now to FIG. 13, one embodiment of a method 900 for efficient identification of dependent instructions on speculative load operations in a processor is shown. The components embodied in the processor core 100 and pick queue 400 described above may generally operate in accordance with method 900. For purposes of discussion, the steps in this embodiment are shown in sequential order. However, some steps may occur in a different order than shown, some steps may be performed concurrently, some steps may be combined with other steps, and some steps may be absent in another embodiment.

A processor core 100 may be executing instructions of one or more software applications. In block 902, core 100 fetches instructions of one or more software applications. These fetched instructions are decoded and renamed in block 904. Renamed instructions are allocated in pick queue 400 in block 906.

If a load instruction stored in the pick queue 400 is not picked (conditional block 908) during a pick pipe stage, then in block 910, core 100 continues to process instructions of the computer program. Other instructions that are picked may maintain entries in the pick queue 400 and have corresponding information sent to the issue unit 230. Control flow of method 900 returns to block 902. It is understood that pipe stages and corresponding operations overlap, although control flow returns to block 902.

Otherwise, if a load instruction stored in the pick queue 400 is picked (conditional block 908) during a pick pipe stage, then in block 912, circuitry within the pick queue 400 may detect the direct dependent instructions stored in the pick queue 400. The dependency information stored in the dependency matrix 440 may be used during this detection. For example, a logic AND-OR reduction may be performed to determine a dependency vector 810 as shown in FIG. 12. This dependency vector 810 may be stored in flip-flops for later use.

If the corresponding load instruction does not yet have its hit/miss status resolved (conditional block 914), then in block 916, in the subsequent clock cycle, the binary logic AND-OR reduction is repeated between the stored value of the dependency vector 810 and each entry 442 of the dependency matrix 440. This updated dependency vector 810 may be stored in the same flip-flops. This subsequent iteration may have found new direct dependency instructions that were allocated in the pick queue 400 in a clock cycle after the load instruction was picked. Also, this subsequent iteration may have found indirect dependent instructions previously stored in the pick queue 400, but were not found in a previous clock cycle. Control flow of method 900 returns to conditional block 914 until the hit/miss status of the load instruction is resolved.

When the load instruction hit/miss status is resolved (conditional block 914), a corresponding replay is unnecessary and incorrect if the load instruction hit in the data cache (conditional block 918). Accordingly, the corresponding dependency vector 810 values may be reset in block 920 and control flow of method 900 returns to block 902. Otherwise, if the load instruction missed in the data cache (conditional block 918), then in block 922, the values stored in the dependency vector 810 may be used for selective replay. The stored values in the dependency vector 810 may be used to cancel the younger dependent instructions in various locations throughout processor core 100. Also, these stored values may be used to reset within the pick queue 400 these younger dependent instructions. A reset of these younger dependent instructions may comprise deasserting their respective picked fields 424 and trigger fields 426. Likewise, the corresponding load instruction may have its trigger field 426 deasserted. It is noted a misspeculation may comprise a load instruction miss in the data cache, a load instruction miss in the d-TLB, or a read-after-write (RAW) hazard associated with the load instruction. In addition, independent operations may be allowed to be picked in the same cycle that other dependent operations are being canceled for a given thread. Allowing independent operations to be picked while canceling dependent operations may improve the overall performance of the processor It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A unified microprocessor pick queue comprising:
control circuitry; and
an array configured to dynamically allocate any available entry of a plurality of entries for an instruction, wherein each allocated entry of said entries comprises for a given instruction a separate dependency bit for each other instruction in the array, wherein each dependency bit indicates whether the given instruction depends on a result of a corresponding other instruction;
wherein during each pipe stage prior to resolving a speculative load instruction, the circuitry is configured to:
determine whether each entry of the plurality of entries corresponds to an instruction with a direct dependency on the load instruction and whether each entry corresponds to an instruction with an indirect dependency on the load instruction, based at least in part on said separate dependency bits already stored in the array and a dependency vector corresponding to the load instruction, wherein the dependency vector is stored separate from the array;
update and store the dependency vector with the direct and the indirect determined dependencies; and
wherein responsive to the speculative load resolving to a misspeculation, the circuitry is further configured to:
utilize the dependency vector to identify both picked instructions which are directly dependent and picked instructions which are indirectly dependent on the speculative load, wherein the picked instructions are picked in a same cycle or a previous cycle to a cycle during which the speculative load is resolving and reset an instruction state of the identified instructions in said same cycle; and
utilize the dependency vector to selectively cancel execution of only the identified instructions.

2. The pick queue as recited in claim 1, wherein said dependency vector comprises a separate load dependency bit for each entry of said entries, wherein each load dependency bit indicates whether a corresponding entry of said entries corresponds to an instruction directly or indirectly dependent upon the load instruction.

3. The pick queue as recited in claim 1, wherein during each pipe stage prior to resolving a speculative load instruction, the circuitry is further configured to:
identify newly allocated instructions with a direct dependency on the speculative load instruction;
identify previously undetected allocated instructions with an indirect dependency on the speculative load instruction; and
update the dependency vector based on the newly allocated and previously undetected allocated instructions, wherein the dependency vector is updated with a one-hot vector corresponding to an entry of the plurality of entries holding the load instruction.

4. The pick queue as recited in claim 1, wherein in order to determine whether each entry of the plurality of entries corresponds to an instruction directly or indirectly dependent upon the load instruction, the circuitry is configured to perform a Boolean and-or combination of the separate dependency bits and the dependency vector.

5. The pick queue as recited in claim 4, wherein a speculation status of the speculative load instruction comprises one of the following: a data cache hit/miss, a data translation look-aside buffer (d-TLB) hit/miss, and a read-after-write (RAW) hazard.

6. The pick queue as recited in claim 2, wherein the circuitry is further configured to stall pick for each entry of said entries that are allocated in a same cycle the speculative load is resolving.

7. The pick queue as recited in claim 1, wherein the circuitry is further configured to allow instructions which are not dependent upon the speculative load to be picked for execution in at least said same cycle.

8. A method comprising:
dynamically allocating any available entry of a plurality of entries for an instruction, wherein each allocated entry of said entries comprises for a given instruction a separate dependency bit for each other instruction in the array, wherein each dependency bit indicates whether the given instruction depends on a result of a corresponding other instruction;
determining whether each entry of the plurality of entries corresponds to an instruction with a direct dependency on the load instruction and whether each entry corresponds to an instruction with an indirect dependency on the load instruction, based at least in part on said separate dependency bits already stored in the array and a dependency vector corresponding to the load instruction, wherein the dependency vector is stored separate from the array; and
updating and storing the dependency vector with the direct and the indirect determined dependencies; and
wherein responsive to the speculative load resolving to a misspeculation:
utilizing the dependency vector to identify both picked instructions which are directly dependent and picked instructions which are indirectly dependent on the speculative load, wherein the picked instructions are picked in a same cycle or a previous cycle to a cycle during which the speculative load is resolving and reset an instruction state of the identified instructions in said same cycle; and
utilizing the dependency vector to selectively cancel execution of only the identified instructions.

9. The method as recited in claim 8, wherein said dependency vector comprises a separate load dependency bit for each entry of said entries, wherein each load dependency bit indicates whether a corresponding entry of said entries corresponds to an instruction directly or indirectly dependent upon the load instruction.

10. The method as recited in claim 9, wherein a value of said dependency vector, within a pipe stage in which the load instruction is initially picked, is updated each cycle with a one-hot vector corresponding to an entry of the plurality of entries holding the load instruction.

11. The method as recited in claim 10, wherein said determining comprises a Boolean and-or combination of the separate dependency bits and the dependency vector.

12. The method as recited in claim 11, wherein a speculation status of the speculative load instruction comprises one of the following: a data cache hit/miss, a data translation look-aside buffer (d-TLB) hit/miss, and a read-after-write (RAW) hazard.

13. The method as recited in claim 9, wherein the method further comprises stalling pick for each entry of said entries that are allocated in a same cycle the speculative load is resolving.

14. The method as recited in claim 8, wherein the method further comprises allowing instructions which are not dependent upon the speculative load to be picked for execution.

15. A non-transitory computer readable storage medium storing program instructions operable to efficiently pick out-of-order computer program instructions, wherein the program instructions are executable to:
- dynamically allocate any available entry of a plurality of entries for an instruction, wherein each allocated entry of said entries comprises for a given instruction a separate dependency bit for each other instruction in the array, wherein each dependency bit indicates whether the given instruction depends on a result of a corresponding other instruction;
- determine whether each entry of the plurality of entries corresponds to an instruction with a direct dependency on the load instruction and whether each entry corresponds to an instruction with an indirect dependency on the load instruction, based at least in part on said separate dependency bits already stored in the array and a dependency vector corresponding to the load instruction, wherein the dependency vector is stored separate from the array; and
- update and store the dependency vector with the direct and the indirect determined dependencies; and
- wherein responsive to the speculative load resolving to a misspeculation:
    - utilize the dependency vector to identify both picked instructions which are directly dependent and picked instructions which are indirectly dependent on the speculative load, wherein the picked instructions are picked in a same cycle or a previous cycle to a cycle during which the speculative load is resolving and reset an instruction state of the identified instructions in said same cycle; and
    - utilize the dependency vector to selectively cancel execution of only the identified instructions.

16. The non-transitory storage medium as recited in claim 15, wherein said dependency vector comprises a separate load dependency bit for each entry of said entries, wherein each load dependency bit indicates whether a corresponding entry of said entries corresponds to an instruction directly or indirectly dependent upon the load instruction.

17. The non-transitory storage medium as recited in claim 16, wherein a value of said dependency vector, within a pipe stage in which the load instruction is initially picked, is updated with a one-hot vector corresponding to an entry of the plurality of entries holding the load instruction.

18. The non-transitory storage medium as recited in claim 17, wherein said determination for each entry of said entries comprises a Boolean and-or combination of the separate dependency bits and the dependency vector.

* * * * *